(12) United States Patent
Choi et al.

(10) Patent No.: US 10,373,483 B2
(45) Date of Patent: Aug. 6, 2019

(54) ELECTRONIC DEVICE FOR CONTROLLING UNMANNED AERIAL VEHICLE AND METHOD OF OPERATING THE SAME

(71) Applicant: Samsung Electronics Co., Ltd., Gyeonggi-do (KR)

(72) Inventors: Bo-Kun Choi, Seoul (KR); Youn-Lea Kim, Seoul (KR); In-Hyuk Choi, Seoul (KR); Sung-Jun Kim, Daegu (KR); Seung-Nyun Kim, Incheon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/896,564

(22) Filed: Feb. 14, 2018

(65) Prior Publication Data
US 2018/0240330 A1 Aug. 23, 2018

(30) Foreign Application Priority Data
Feb. 20, 2017 (KR) .......................... 10-2017-0022553

(51) Int. Cl.
*B64C 39/02* (2006.01)
*B64D 47/08* (2006.01)
(Continued)

(52) U.S. Cl.
CPC ............. *G08C 17/02* (2013.01); *G08G 5/006* (2013.01); *G08G 5/0013* (2013.01);
(Continued)

(58) Field of Classification Search
CPC ..... B64D 47/08; B64C 39/02; B64C 2201/00; B64C 2201/12; B64C 2201/122; B64C 2201/123; B64C 2201/14
See application file for complete search history.

(56) References Cited

U.S. PATENT DOCUMENTS 9,292,705 B2    3/2016  Lemmey et al.
9,415,869 B1 *  8/2016  Chan ..................... B64C 39/024
(Continued)

FOREIGN PATENT DOCUMENTS

KR    10-2016-0072425 A    6/2016
KR    10-2017-0005650 A    1/2017

OTHER PUBLICATIONS

International Search Report dated May 23, 2018.

*Primary Examiner* — Blane J Jackson
(74) *Attorney, Agent, or Firm* — Cha & Reiter, LLC.

(57) ABSTRACT

A system, devices and method are disclosed herein. The system may include a network interface, a memory, the two devices and a processor, which implements the method. The method may include receiving by a first device a location of a second device through the network interface, retrieving by the second device a plurality of media related to the received location, transmitting by the second device the plurality of media to the first device through the network interface, in response to receiving a selection of one of the plurality of media, transmit, through the network interface, transmitting by the first device control information for controlling a particular UAV selected from the plurality of UAVs based on corresponding with the selected one of the plurality of media to the second device.

20 Claims, 30 Drawing Sheets

(51) Int. Cl.
  *G08C 17/02*  (2006.01)
  *H04W 4/20*  (2018.01)
  *G08G 5/00*  (2006.01)
  *H04L 29/08*  (2006.01)
  *H04W 4/44*  (2018.01)

(52) U.S. Cl.
  CPC ......... *G08G 5/0026* (2013.01); *G08G 5/0069* (2013.01); *G08G 5/0082* (2013.01); *H04W 4/20* (2013.01); *B64C 39/024* (2013.01); *G08C 2201/30* (2013.01); *G08C 2201/42* (2013.01); *G08C 2201/50* (2013.01); *G08C 2201/70* (2013.01); *G08C 2201/91* (2013.01); *G08C 2201/93* (2013.01); *H04L 67/125* (2013.01); *H04W 4/44* (2018.02)

(56) References Cited

U.S. PATENT DOCUMENTS

| | | |
|---|---|---|
| 2016/0046374 A1 | 2/2016 | Kugelmass |
| 2016/0164874 A1 | 6/2016 | Lemmey et al. |
| 2016/0180717 A1 | 6/2016 | Ubhi et al. |
| 2016/0266579 A1* | 9/2016 | Chen .................... G05D 1/0038 |
| 2016/0292545 A1* | 10/2016 | Hayakawa ......... G06K 15/1809 |
| 2016/0307447 A1 | 10/2016 | Johnson et al. |
| 2017/0023939 A1* | 1/2017 | Krouse ................ G05D 1/0022 |
| 2018/0194455 A1 | 7/2018 | Park et al. |
| 2018/0278827 A1* | 9/2018 | Barnes ............... H04N 5/23206 |

* cited by examiner

ELECTRONIC DEVICE FOR CONTROLLING UNMANNED AERIAL VEHICLE AND METHOD OF OPERATING THE SAME

CROSS-REFERENCE TO RELATED APPLICATION(S)

This application claims the benefit under 35 U.S.C. § 119(a) of a Korean patent application filed in the Korean Intellectual Property Office on Feb. 20, 2017 and assigned Serial No. 10-2017-0022553, the entire disclosure of which is incorporated herein by reference.

TECHNICAL FIELD

Various embodiments of the present disclosure relate to electronic devices for controlling unmanned aerial vehicles (UAVs) and methods for operating the same.

BACKGROUND

As avionics are recently combined with telecommunication technology, unmanned aerial vehicles (UAVs), commonly known as drones, are becoming commonplace.

UAVs with a camera may be used for aerial photography. Their applications or use are also found in other various industries, such as agriculture or product delivery services.

It is not easy for an unskilled user to take high-quality aerial photographs using an UAV. For this reason, producing a satisfactory result in aerial photography demands sophisticated camera control as well as a skill in piloting technique.

Another issue with UAVs is portability. Many difficulties may ensue from, long-term travel with a UAV since they are such heavy and bulky devices, although utilizing a UAV is oftentimes desirable in contexts such as a tourist attraction.

The above information is presented as background information only to assist with an understanding of the present disclosure. No determination has been made, and no assertion is made, as to whether any of the above might be applicable as prior art with regard to the present disclosure.

SUMMARY

According to various embodiments of the present disclosure, there may be provided an electronic device for setting up an authority to temporarily control an UAV to perform a particular function and a method for operating the electronic device.

According to an embodiment of the present disclosure, a system may comprise a computing device, a network interface, a processor, and a memory storing instructions executable by the processor to: receive a location of the external electronic device through the network interface, retrieve a plurality of media related to the received location, transmit the plurality of media to the external electronic device through the network interface, and in response to receiving a selection of one of the plurality of media, transmit, through the network interface, control information for controlling a particular UAV selected from the plurality of UAVs based on correspondence with the selected one of the plurality of media to the external electronic device.

In another embodiment of the invention, an electronic device is disclosed including a display, a communication circuit communicatively connected with a wireless network, a processor electrically coupled with the communication circuit, and a memory electrically coupled with the processor, wherein the memory stores instructions executable by the processor to establish a wireless link with an external computing device through the communication circuit, transmit a location of the electronic device to the external computing device through the communication circuit, receive image data including a plurality of images related to the location from the external computing device through the communication circuit, detect selection of a first image from among the plurality of images and transmit the selection to the external computing device, and receive, from the external computing device control information for controlling a first unmanned aerial vehicle (UAV) corresponding to the selected first image.

In another embodiment of the invention, a method in a computing device is disclosed, including: establishing a wireless link with an external electronic device through a network interface, in response to receiving a location of the external electronic device through the network interface, retrieving image data including a plurality of images corresponding to the location, transmitting the retrieved image data to the external electronic device through the network interface, receiving, from the external electronic device, information indicating selection of a first image from among the plurality of images through the network interface, selecting a first unmanned aerial vehicle (UAV) from among a plurality of UAVs corresponding to the selected first image, and transmitting control information for the selected first UAV to the external electronic device through the network interface.

In another embodiment of the invention, a method in an electronic device is disclosed, including establishing a wireless link with a computing device through a communication module, transmitting a location of the electronic device to the computing device through the communication module, receiving image data including a plurality of images related to the location from the computing device through the communication module, in response to detecting selection of a first image from among the plurality of images, transmitting information indicating selection of the first image through the communication module to the computing device, and receiving control information for controlling a first unmanned aerial vehicle (UAV) through the communication module from the computing device, wherein first UAV is selected from among a plurality of UAVs by the computing device based on correspondence to the selected first image.

Other aspects and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
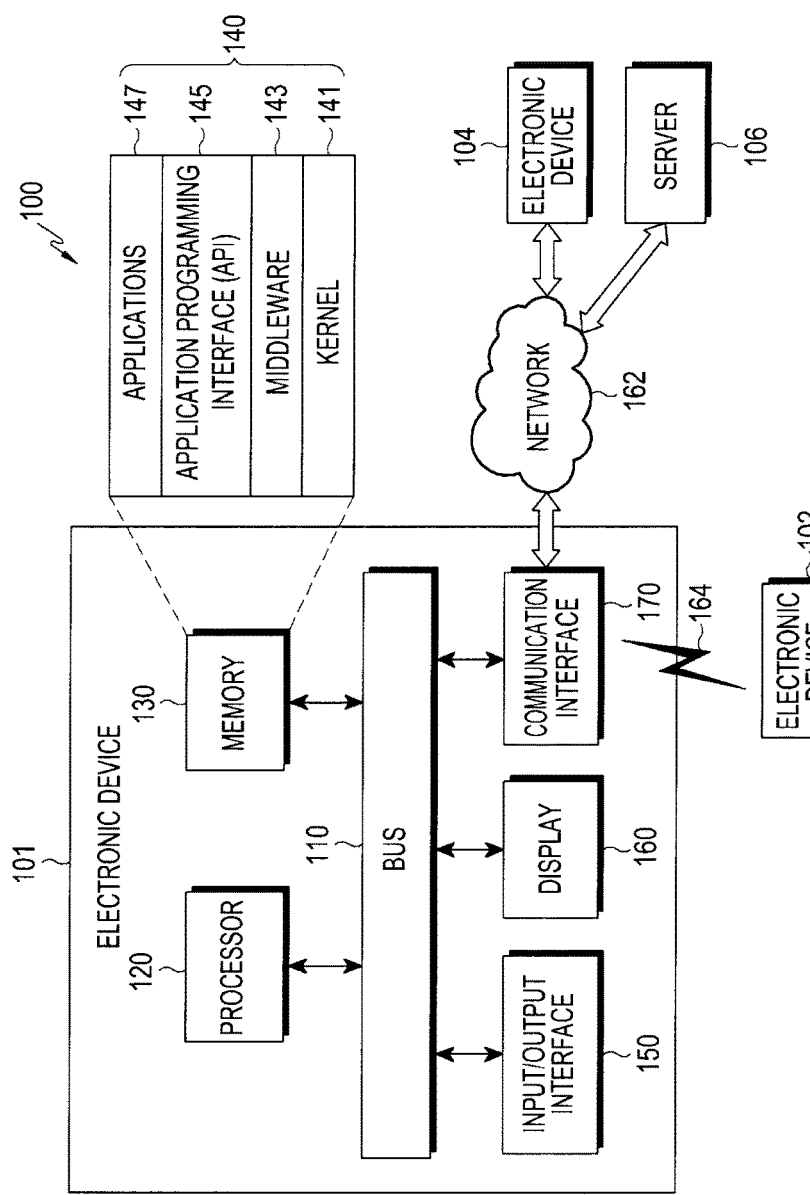
FIG. 1 is a block diagram illustrating an electronic device and a network according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of two or more of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). As another example, the kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present disclosure, the wireless communication may include at least one of, e.g., wireless-fidelity (Wi-Fi), light-fidelity (Li-Fi), BlueTooth, BlueTooth Low Energy (BLE), Zigbee, near-field communication (NFC), magnetic secure transmission (MST), radio frequency (RF), or body area network (BAN) as denoted with denotation 164 of FIG. 1. According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
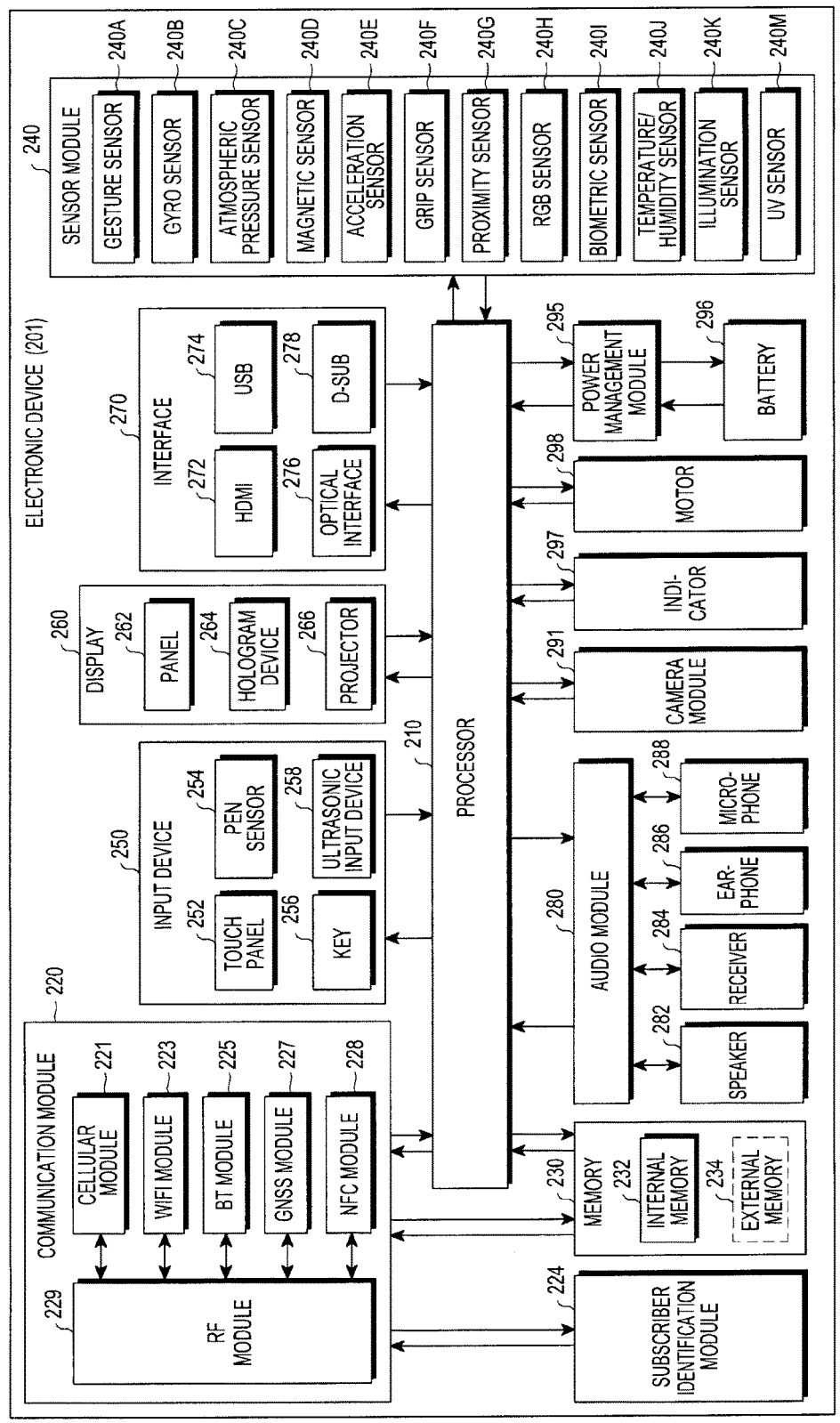
FIG. 2 is a block diagram illustrating an electronic device according to an embodiment of the present disclosure.

FIG. 2 is a block diagram illustrating an electronic device 201 according to an embodiment of the present disclosure. An electronic device 201 may include the whole or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170 of FIG. 1. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide, e.g., voice call, video call, messaging services, or internet services, through a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the BlueTooth module 225, the GNSS module 227, or the NFC module 228 may communicate RF signals through a separate RF module. The subscriber identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory Stick™. The external memory 234 may be functionally or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input device 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 150 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
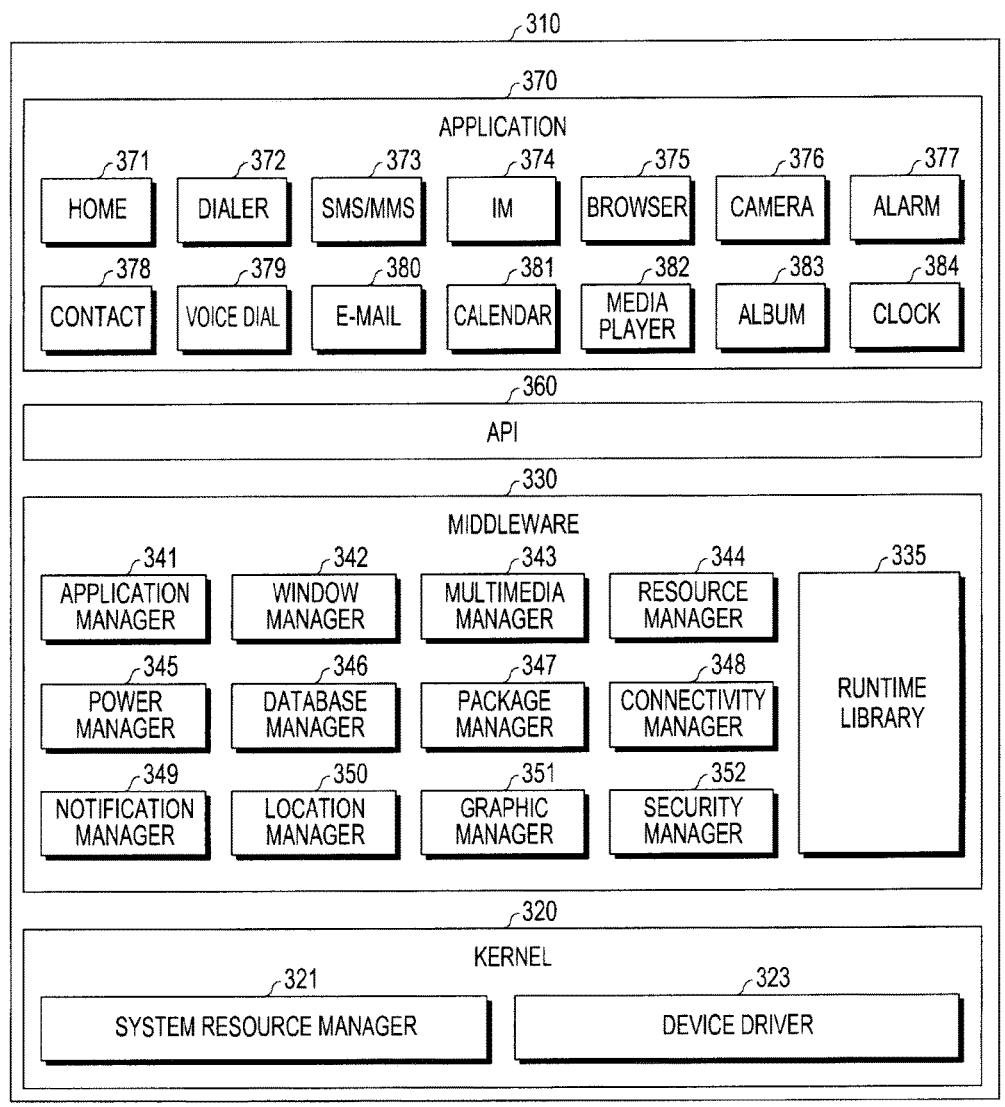
FIG. 3 is a block diagram illustrating a program module according to an embodiment of the present disclosure.

FIG. 3 is a block diagram illustrating a program module according to an embodiment of the present disclosure. According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly utilized by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats desirable to play media files and use a codec appropriate for a format to perform encoding or decoding on media files. The resource manager 344 may manage the source code or memory space of the application 370. The power manager 345 may manage, e.g., the battery capability or power and provide power information desirable for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a healthcare application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may be interchangeably used with other term, e.g., a logic, logic block, part, or circuit. The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations.

According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 4A:
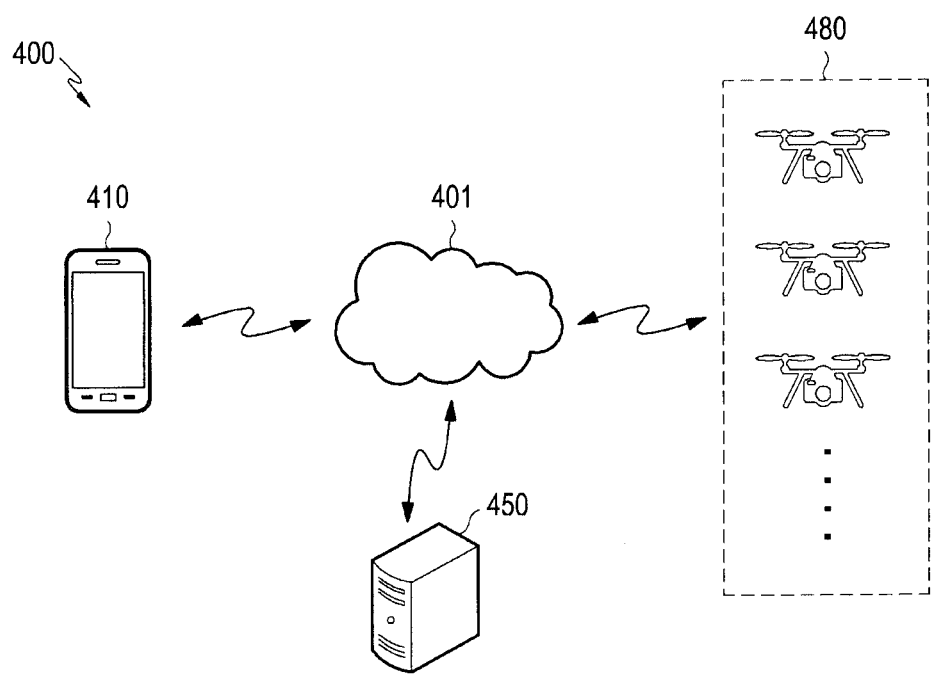
FIG. 4A is a block diagram schematically illustrating an electronic system according to an embodiment of the present disclosure.

FIG. 4A is a block diagram schematically illustrating an electronic system according to an embodiment of the present disclosure.

Referring to FIG. 4A, an electronic system 400 may include a network 401, a first electronic device 410, a second electronic device 450, and a plurality of unmanned aerial vehicles (UAVs) 480.

According to an embodiment of the present disclosure, in the electronic system 400, the first electronic device 410 (e.g., the electronic device 101 or 102 of FIG. 1 or the electronic device 201 of FIG. 2) connected to the network 401 (e.g., the network 162 of FIG. 1) may control the plurality of UAVs 480 (e.g., the electronic device 104 of FIG. 1) through the second electronic device 450 (e.g., the server 106 of FIG. 1).

According to an embodiment of the present disclosure, the first electronic device 410, the second electronic device 450, and the plurality of UAVs 480 may be connected to the network 401. For example, the network 401 may be implemented as a wired or wireless network.

According to an embodiment of the present disclosure, the first electronic device 410 may send a request for control information for controlling at least one of the plurality of UAVs 480 to the second electronic device 450. The first electronic device 410 may obtain control information by which the first electronic device 410 may temporarily control at least one of the plurality of UAVs 480 from the second electronic device 450. As another example, the first electronic device 410 may control at least one of the plurality of UAVs 480 using control information obtained from the second electronic device 450. For example, the first electronic device 410 may include a smartphone, a personal computer (PC), a tablet PC, a laptop computer, and/or a terminal.

According to an embodiment of the present disclosure, the second electronic device 450 may control the overall operation of the plurality of UAVs 480. For example, the second electronic device 450 may determine the state of the plurality of UAVs 480 and control the flight of the plurality of UAVs 480.

According to an embodiment of the present disclosure, the second electronic device 450 may transmit control information that enables at least one of the plurality of UAVs 480 to be controlled to the first electronic device 450. In this case, the second electronic device 450 may control at least one of the plurality of UAVs 480 according to a control request from the first electronic device 450 based on the control information transmitted to the first electronic device 450.

According to an embodiment of the present disclosure, the plurality of UAVs 480 may be flown under the control of the second electronic device 450. For example, the plurality of UAVs 480 may include an aircraft or apparatus that may be flown without a human pilot aboard, e.g., drones. The plurality of UAVs 480 may be, e.g., the same or different in type from each other.

Hereinafter, the plurality of UAVs 480 may also refer to a single UAV according to contexts. For example, instead of the plurality of UAVs 480, a single UAV may be used.

According to an embodiment of the present disclosure, at least one of the plurality of UAVs 480 may be flown temporarily based on a control request from the first electronic device 410. For example, at least one of the plurality of UAVs 480 may be operated within a control authority contained in the control information transmitted from the second electronic device 450 to the first electronic device 410 based on the control request of the first electronic device 410.

Figure 4B:
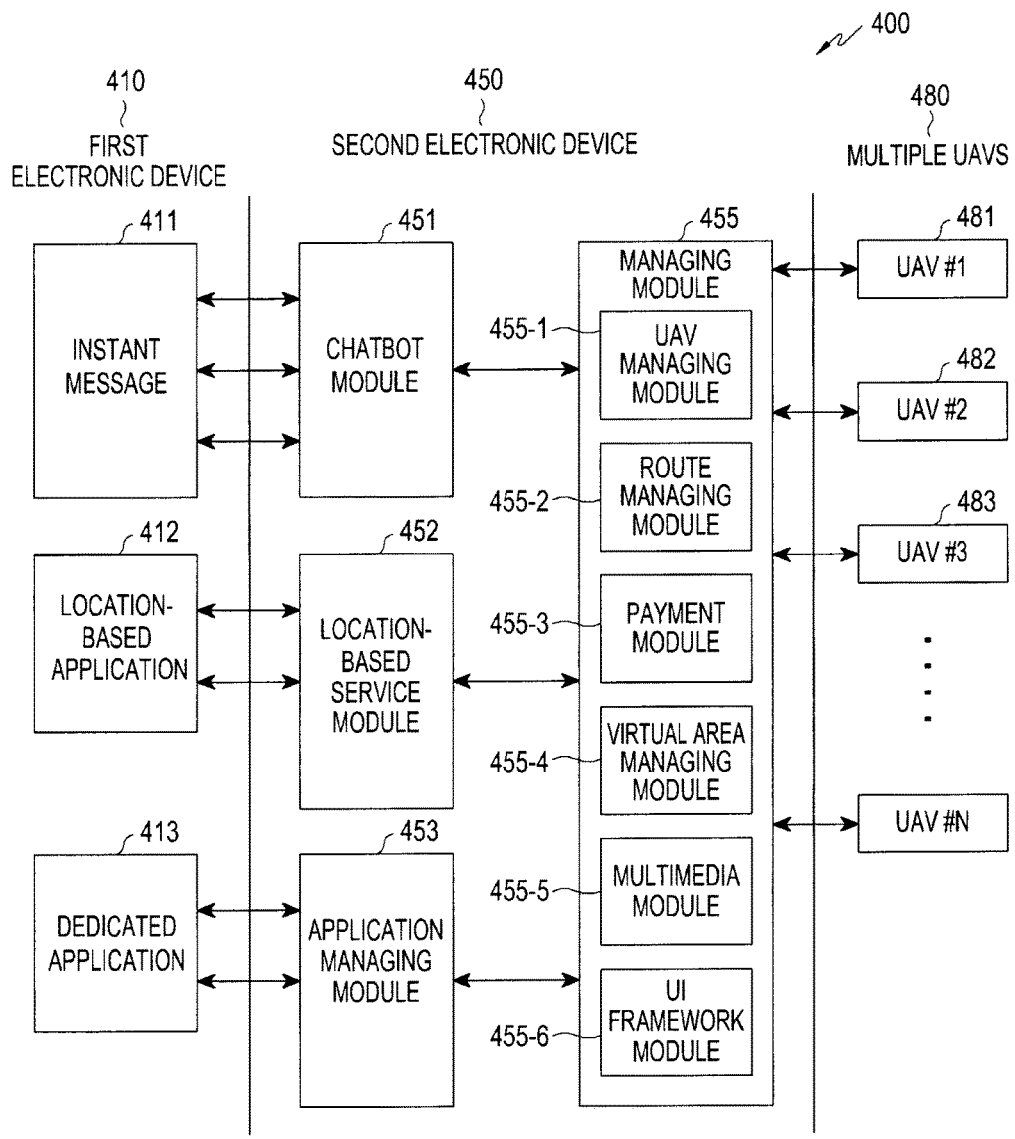
FIG. 4B is a block diagram specifically illustrating an electronic system according to an embodiment of the present disclosure.

FIG. 4B is a block diagram specifically illustrating an electronic system according to an embodiment of the present disclosure.

Referring to FIG. 4B, an electronic system 400 may be implemented to be substantially the same or similar to the electronic system 400 described above in connection with FIG. 4A.

According to an embodiment of the present disclosure, the first electronic device 410 (e.g., the electronic device 101 or 102 of FIG. 1 or the electronic device 201 of FIG. 2) may send a request for an authority for controlling (requesting to control) at least one of the plurality of UAVs 480 to the second electronic device 450 (e.g., the server 106 of FIG. 1) using an instant message 411, a location-based application 412, and/or a dedicated application 413.

According to an embodiment of the present disclosure, the second electronic device 450 may include a "chatbot" module 451, a location-based service module 452, and/or an application managing module 453. The "chatbot" module may be an interactive control interface provided through a conversational application, such as SMS or messaging apps.

For example, the second electronic device 450 may receive a request from the first electronic device 410 using the instant message 411 through the chatbot module 451. The second electronic device 450 may receive the request from the first electronic device 410 using the location-based application 412 through the location-based service module 452. The second electronic device 450 may receive the request from the first electronic device 410 using the dedicated application 413 through the application managing module 453.

According to an embodiment of the present disclosure, the second electronic device 450 may include a managing module 455. For example, the managing module 455 may mean a module, program, firmware, and/or electronic device (e.g., a server or part of the server) for managing the plurality of UAVs 480. For example, the managing module 455 may include a UAV managing module 455-1, a route managing module 455-2, a payment module 455-3, a virtual fence managing module 455-4, a multimedia module 455-5, and/or a user interface (UI) framework module 455-6.

According to an embodiment of the present disclosure, the UAV managing module 455-1 may control the overall operation of the plurality of UAVs 480. For example, the UAV managing module 455-1 may determine the state (e.g., the current location, whether they performs other functions, and/or battery status) of the plurality of UAVs 480 and control the flight of the plurality of UAVs 480.

According to an embodiment of the present disclosure, the route managing module 455-2 may control the flight route of the plurality of UAVs 480. For example, the route managing module 455-2 may set up a flight route along which the plurality of UAVs 480 do not collide with each other. As another example, the route managing module 455-2 may set up an optimal route (or shortest route) along which the plurality of UAVs 480 travel to a particular place.

According to an embodiment of the present disclosure, the payment module 455-3 may control payment for an authority for controlling at least one of the plurality of UAVs 480 that the first electronic device 410 uses. For example, when the first electronic device 410 sends a request for an authority for controlling at least one of the plurality of UAVs 480, the payment module 455-3 may request the first electronic device 410 to pay for an authority for controlling at least one of the plurality of UAVs 480. As another example, the payment module 455-3 may perform operations related to payment for the authority for the first electronic device 410 to control at least one of the plurality of UAVs 480.

According to an embodiment of the present disclosure, the virtual fence managing module 455-4 may set up a virtual area where the plurality of UAVs 480 may fly. For example, the virtual fence managing module 455-4 may set up a virtual area for the first electronic device 410 to control one of the plurality of UAVs 480 within the virtual area.

According to an embodiment of the present disclosure, the multimedia module 455-5 may manage or control a control request related to multimedia among control requests from the first electronic device 410. For example, when the first electronic device 410 sends a request for a photographing-related function using at least one of the plurality of UAVs 480, the multimedia module 455-5 may transmit or receive photographing-related data to/from the first electronic device 410. As another example, the multimedia module 455-5 may store the photographing-related data.

According to an embodiment of the present disclosure, the UI framework module 455-6 may transmit information about a UI to the first electronic device 410. For example, when the first electronic device 410 sends a request for a photographing-related function using at least one of the plurality of UAVs 480, the UI framework module 455-6 may transmit a photographing-related UI to the first electronic device 410.

Figure 5A:
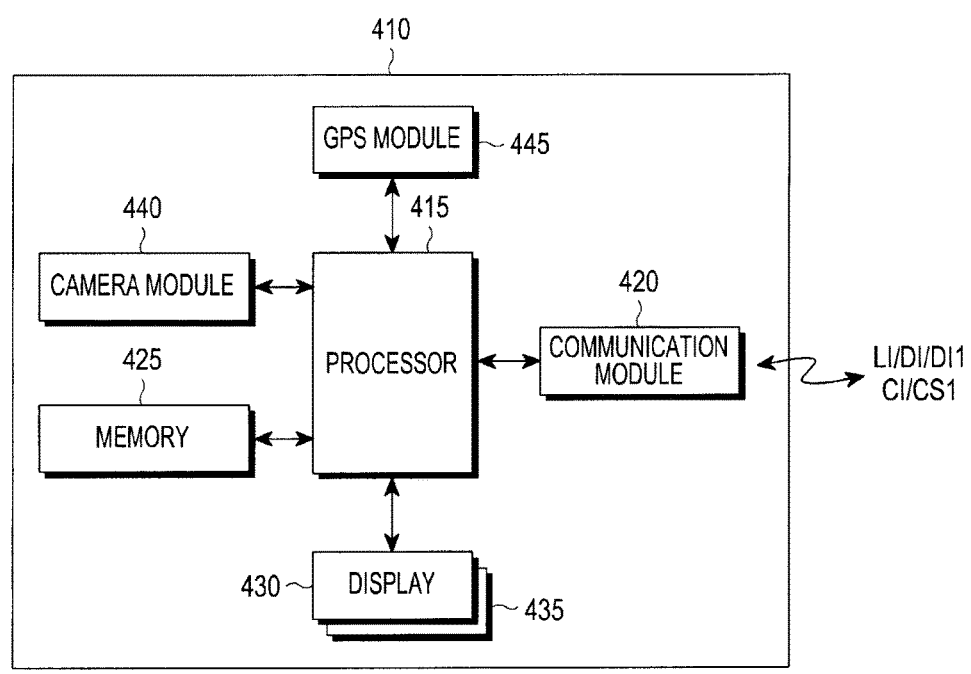
FIG. 5A is a block diagram schematically illustrating a first electronic device according to an embodiment of the present disclosure.

FIG. 5A is a block diagram schematically illustrating a first electronic device according to an embodiment of the present disclosure.

Referring to FIG. 5A, a first electronic device 410 (e.g., the electronic device 101 or 102 of FIG. 1, the electronic device 201 of FIG. 2, or the electronic device 410 of FIG. 4A and FIG. 4B) may include a processor 415, a communication module 420, a memory 425, a display 430, a camera module 440, and a global positioning system (GPS) 445.

According to an embodiment of the present disclosure, the processor 415 may control the operation of the first electronic device 410.

According to an embodiment of the present disclosure, the processor 415 may generate location information LI about the first electronic device 410 using the camera module 440 and/or the GPS module 445. As another example, the processor 415 may transmit the location information LI through the communication module 420 to the second electronic device 450.

According to an embodiment of the present disclosure, the location information LI may mean the location (e.g., the current location) of the first electronic device 410. For example, the location information LI may include a GPS signal indicating the location of the first electronic device 410. As another example, the location information LI may include an image (e.g., an image capable of indicating a location around the first electronic device 410) capable of recognizing the location of the first electronic device 410.

The processor 415 may receive information about controlling at least one (e.g., the first UAV 481) of a plurality of UAVs 480 (e.g., the plurality of UAVs 480 of FIG. 4A and FIG. 4B) corresponding to the location information LI through the communication module 420. For example, the information about controlling the first UAV 481 may mean information about an authority for controlling the first UAV 481 in the location that the location information LI indicates. As another example, the information about controlling the first UAV 481 may include information about an authority for performing a function, such as image capturing, product delivery, pesticide-dusting, and/or crop-dusting using the first UAV 481.

According to an embodiment of the present disclosure, the information about controlling the first UAV 481 may include image data DI including at least one image (e.g., a plurality of sample images) that may be captured using the first UAV 481 in the location that the location information LI indicates. As another example, the information about controlling the first UAV 481 may also include image data DI indicating a function that may be provided by the first UAV 481 in the location that the location information LI indicates. For example, the first UAV 481 may mean a UAV for performing the function among the plurality of UAVs 480. For example, the first UAV 481 may be selected by the second electronic device 450. Similar operations may thus occur for a second UAV 482 or a third UAV 483, up to any desired number of UAVs (e.g., UAV "#N").

According to an embodiment of the present disclosure, the processor 415 may select a function that may be provided by the first UAV 481. The processor 415 may transmit information about the selected function through the communication module 420 to the second electronic device 450.

According to an embodiment of the present disclosure, the processor 415 may receive control information CI from the second electronic device 450 through the communication module 420.

For example, the control information CI may mean information for controlling at least one first UAV 481 of the plurality of UAVs 480. For example, the control information CI may include information about a control authority for performing a particular function using the first UAV 481. The control information CI may include information about a user interface (UI) for controlling the first UAV 481.

For example, the control authority may include information about the time and place (e.g., a flyable area or controllable area) where the first UAV 481 is controllable and/or a controllable function (e.g., image capturing).

According to an embodiment of the present disclosure, the processor 415 may transmit a first control signal CS1 corresponding to the control information CI to the second electronic device 450. For example, the first control signal CS1 may mean a signal that the first electronic device 410 transmits to the second electronic device 450 to control the first UAV 481 based on the control information CI.

According to an embodiment of the present disclosure, the communication module 420 may connect to a network 401 (e.g., the network 401 of FIG. 4A) under the control of the processor 415. For example, the communication module 420 may include a network interface that may connect to the second electronic device 450 through the network 401.

According to an embodiment of the present disclosure, the memory 425 may store data for the first electronic device 410 to control the first UAV 481 through the second electronic device 450.

According to an embodiment of the present disclosure, the display 430 may display information about a function that is performed through the first UAV 481. For example, the display 430 may include a touch screen 435. The display 30 may receive an input signal through the touch screen 435 and transmit the input signal to the processor 415.

According to an embodiment of the present disclosure, the display 430 may display a UI for controlling the first UAV 481. For example, the display 430 may display the information about the function received from the second electronic device 450. For example, the display 430 may display a plurality of images that may be captured using the first UAV 481. The display may display images captured using the first UAV 481.

The camera module 440 may capture an image (e.g., an image of the surroundings) for the location information LI. As another example, the camera module 440 may transmit the captured image to the processor 415.

The GPS module 450 may receive a GPS signal (e.g., a GPS signal indicating the location of the first electronic device 410) for the location information LI about the first electronic device 410. As another example, the GPS module 450 may transmit the GPS signal to the processor 415.

Figure 5B:
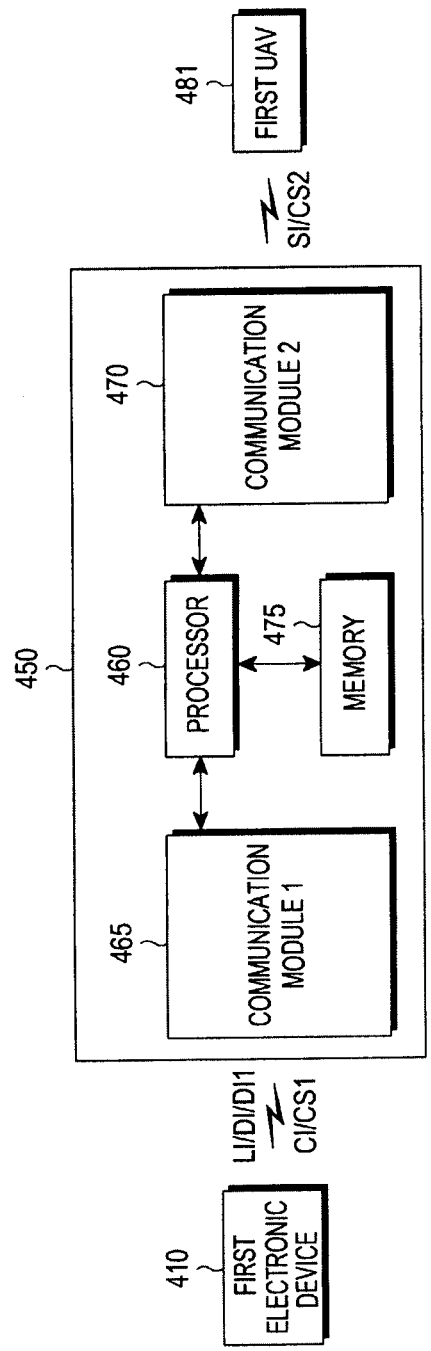
FIG. 5B is a block diagram schematically illustrating a second electronic device according to an embodiment of the present disclosure.

FIG. 5B is a block diagram schematically illustrating a second electronic device according to an embodiment of the present disclosure.

Referring to FIG. 5B, a second electronic device 450 (e.g., the server 106 of FIG. 1) may include a processor 460, a first communication module 465, a second communication module 470, and a memory 475.

According to an embodiment of the present disclosure, the second electronic device 450 may control at least one of a plurality of UAVs 480 (e.g., the plurality of UAVs 480 of FIG. 4). As another example, the second electronic device 450 may transmit control information CI to the first electronic device 410 to allow the first electronic device 410 to control at least one of the plurality of UAVs 480. For example, the second electronic device 450 may include at least one server.

According to an embodiment of the present disclosure, the processor 460 may control the operation of the second electronic device 450. The processor 460 may electrically be connected with the first communication module 465 and the second communication module 470. The first communication module 465 may communicate with the first electronic device 410 via, e.g., a network 401 (e.g., the network 401 of FIG. 4A). As another example, the second communication module 470 may communicate with the plurality of UAVs 480 through the network 401. For example, the first communication module 465 and/or the second communication module 470 each may include a network interface for connecting to the network 401.

Although FIG. 5B illustrates that the first communication module 465 and the second communication module 470 are provided separately for ease of description, the first communication module 465 and the second communication module 470 may be implemented in a single communication module.

According to an embodiment of the present disclosure, the processor 460 may electrically be connected with the memory 475.

According to an embodiment of the present disclosure, the memory 475 may store data desirable for operating the second electronic device 450. For example, the memory 475 may store instructions that are executed by the processor 460.

According to an embodiment of the present disclosure, the processor 460 may execute the instructions stored in the memory 425. The processor 460 may establish a wireless link with the first electronic device 410 through the first communication module 465. The processor 460 may receive location information LI about the first electronic device 410 through the first communication module 465. For example, the location information LI may mean information indicating the location of the first electronic device 410.

According to an embodiment of the present disclosure, the processor 460 may generate information about a function that may be provided by the first UAV 481 based on the location information LI. For example, the processor 460 may generate image data DI containing at least one image (e.g., an image captured in the location of the first electronic device 410) related to the location included in the location information LI. The processor 460 may transmit the image data DI to the first electronic device 410. For example, the image data DI may mean data containing an image that may be captured using the first UAV 481 in the location indicated by the location information LI.

According to an embodiment of the present disclosure, the processor 460 may receive information DI1 about a first image selected by the first electronic device 410 among at least one image included in the image data DI. For example, the information DI1 about the first image may mean information about the first image selected by the first electronic device 410 among a plurality of images included in the image data DI.

According to an embodiment of the present disclosure, the processor 460 may select the first UAV 481 among the plurality of UAVs 480 based on the information DI1 about the first image. For example, the processor 460 may select, as the first UAV 481, a UAV that is in a state appropriate for capturing the first image among the plurality of UAVs 480.

According to an embodiment of the present disclosure, the processor 460 may transmit selection information "SI" to the first UAV 481 through the second communication module 470. For example, the selection information SI may mean information for indicating that the first UAV 481 is selected from among the plurality of UAVs 480. The selection information SI may include a control signal for moving the first UAV 481 to an area where the first electronic device 410 is positioned. The selection information SI may include the location information LI about the first electronic device 410.

According to an embodiment of the present disclosure, the processor 460 may transmit control information CI for controlling the first UAV 481 to the first electronic device 410. The processor 460 may receive a first control signal CS1 corresponding to the control information CI from the first electronic device 410 through the first communication module 465. The processor 460 may transmit a second control signal CS2 corresponding to the first control signal CS1 through the second communication module 470 to the first UAV 481. For example, the second control signal CS2 may mean a signal that the processor 460 transmits to the first UAV 481 to control the first UAV 481 in response to the first control signal CS1.

According to an embodiment of the present disclosure, the processor 460 may compare the first control signal CS1 with a control authority of the first electronic device 410 on the first UAV 481 and transmit the second control signal CS2 to the first UAV 481 according to a result of the comparison. For example, the processor 460 may compare the first control signal CS1 received from the first electronic device 410 with the control authority related to the control information CI about the first electronic device 410. When the first control signal CS1 is contained in the control authority, the processor 460 may transmit the second control signal CS2 corresponding to the first control signal CS1 to the first UAV 481. Unless the first control signal CS1 is contained in the control authority, the processor 460 may abstain from transmitting the second control signal CS2 corresponding to the first control signal CS1 to the first UAV 481. When the first control signal CS1 is not included in the control authority, the processor 460 may also transmit a message to the first electronic device 410 to indicate that the first control signal CS1 is not included in the control authority.

Figure 5C:
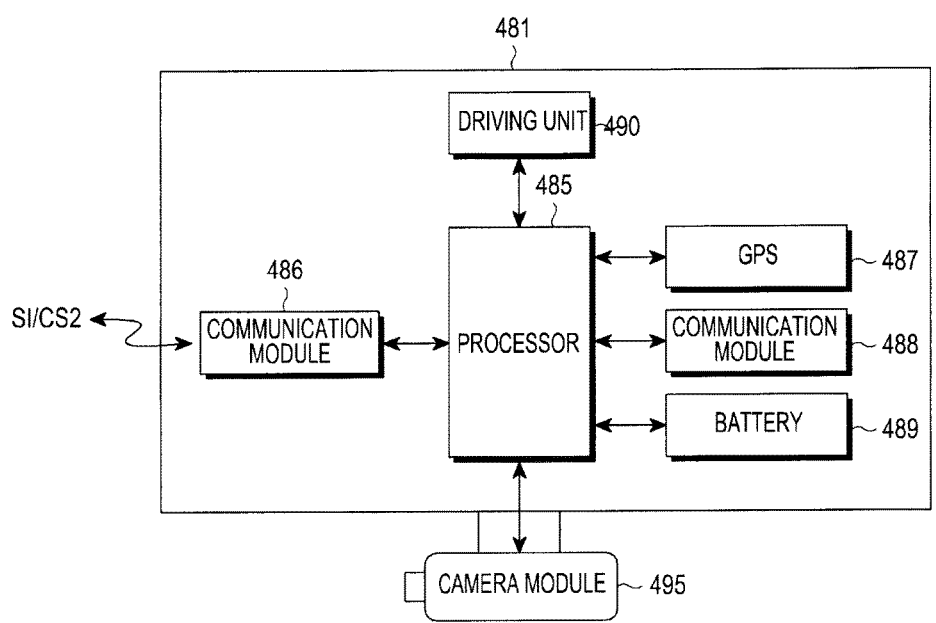
FIG. 5C is a block diagram schematically illustrating a first UAV according to an embodiment of the present disclosure.

FIG. 5C is a block diagram schematically illustrating a first UAV according to an embodiment of the present disclosure.

Referring to FIG. 5C, a first UAV 481 may include a processor 485, a communication module 486, a GPS module 487, a memory 488, a battery 489, a driving unit 490, a sensor module 491, and a camera module 495.

According to an embodiment of the present disclosure, the processor 485 may control the operation of the first UAV 481. According to an embodiment of the present disclosure, the processor 485 may control the flight of the first UAV 481 under the control of the second electronic device 450. The processor 485 may capture an image using the first UAV 481 under the control of the second electronic device 450. The processor 485 may generate image data using the captured image and transmit the image data to the second electronic device 450.

According to an embodiment of the present disclosure, the communication module 486 may connect to a network 401. For example, the communication module 486 may communicate with the second electronic device 450 through the network 401. The communication module 486 may receive selection information SI from the second electronic device 450. The camera module 495 may receive the second control signal CS2 from the second electronic device 450. The communication module 486 may transmit the image data captured through the camera module 495 to the second electronic device 450.

According to an embodiment of the present disclosure, the GPS module 487 may receive a GPS signal. As another example, the GPS module 487 may obtain location information about the first UAV 481 using the GPS signal.

According to an embodiment of the present disclosure, the memory 488 may store data about the first UAV 481. For example, the memory 488 may be implemented as a volatile or non-volatile memory.

According to an embodiment of the present disclosure, the battery 498 may store power for the first UAV 481. The battery 489 may include a power management module for managing power for the first UAV 481.

According to an embodiment of the present disclosure, the driving unit 490 may drive the first UAV 481. The driving unit 490 may be implemented as a flight driving unit for flying the first UAV 481. For example, the driving unit 490 may include at least one propeller (not shown) for flying the first UAV 481.

According to an embodiment of the present disclosure, the sensor module 491 may sense the position or state of the first UAV 481. For example, the sensor module 491 may sense the flying position or state of the first UAV 481 and transmit a sensing signal to the processor 485.

According to an embodiment of the present disclosure, the camera module 495 may capture an image and generate image data. For example, the camera module 495 may capture a still image and/or video. The camera module 495 may be included in the first UAV 481 or may be separately provided from the first UAV 481. The camera module 495 may be implemented to be detachable from the first UAV 481.

Figure 6:
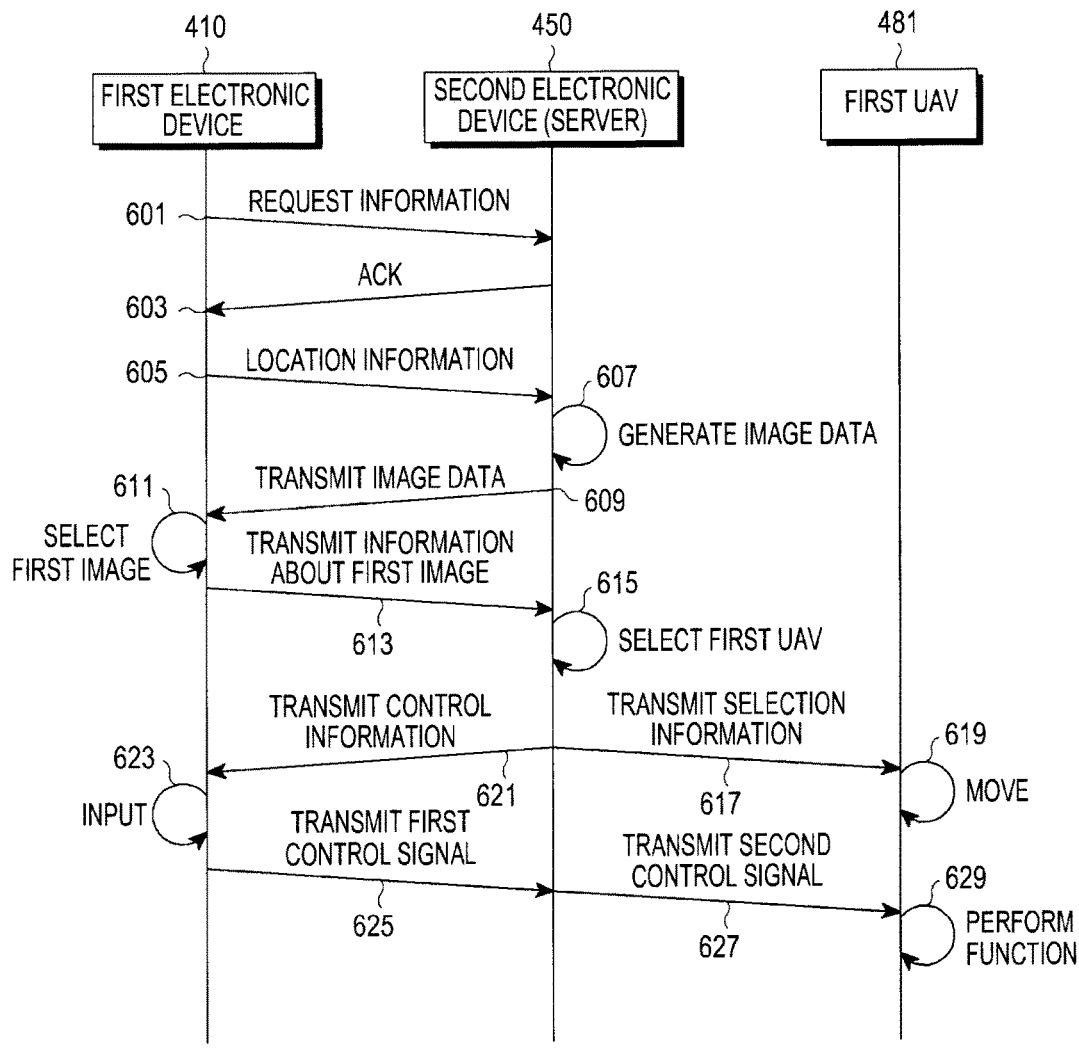
FIG. 6 is a data flowchart illustrating operations of an electronic system according to an embodiment of the present disclosure.

FIG. 6 is a data flowchart illustrating operations of an electronic system according to an embodiment of the present disclosure.

Referring to FIG. 6, an electronic system may be implemented to be substantially the same or similar to the electronic system 400 described above in connection with FIG. 4A.

In operation 601, a first electronic device 410 (e.g., the first electronic device 410 of FIG. 4A or the first electronic device 410 of FIG. 5A) may transmit request information to a second electronic device 450 (e.g., the second electronic device 450 of FIG. 4A or the second electronic device 450 of FIG. 5B). For example, the request information may indicate information by which the first electronic device 410 transmits a request for a control authority for controlling a specific UAV (e.g., at least one of the plurality of UAVs of FIG. 4A, e.g., the first UAV 481 of FIG. 5C) to the second electronic device 450.

In operation 603, the second electronic device 450 may transmit a response signal "ACK" to the first electronic device 410 in response to the request information received from the first electronic device 410.

In operation 605, the first electronic device 410, upon receipt of the response signal ACK, may transmit location information "LI" relevant to the first electronic device 410 to the second electronic device 450. For example, the first electronic device 410 may transmit, to the second electronic device 450 location information LI indicating the current position of the first electronic device 410 (e.g., the geospatial coordinates of the position).

In operation 607, the second electronic device 450 may generate or obtain image data DI including at least one image related to a function of the UAV in response to the location information LI. For example, the image data DI may include an image (e.g., a sample image) that may be captured in the location of the first electronic device 410.

In operation 609, the second electronic device 450 may transmit the image data DI to the first electronic device 410.

In operation 611, the first electronic device 410 may receive the image data DI. The first electronic device 410 may select at least one from among at least one image contained in the image data "DI1." For example, the first electronic device 410 may select a first image from among a plurality of images.

In operation 613, the first electronic device 410 may transmit information DI1 about the selected first image to the second electronic device 450.

In operation 615, the second electronic device 450 may select a first UAV 481 (e.g., the first UAV 481 of FIG. 5C) from among a plurality of UAVs 480 (e.g., the plurality of UAVs 480 of FIG. 4A) in response to receiving the information DI1. For example, the second electronic device 450 may identify respective states of the plurality of UAVs 480, and may select the first UAV 481 that is in a state appropriate for performing a function (e.g., an image or video capturing function) related to the information DI1.

In operation 617, the second electronic device 450 may transmit the selection information "SI" to the selected first UAV 481. For example, the selection information SI may include location information about the first electronic device 410 or information related to the movement of the first UAV 481.

In operation 619, the first UAV 481 may be controlled as to move to the location of the first electronic device 410 in response to the selection information SI.

In operation 621, the second electronic device 450 may transmit control information "CI" for controlling the first UAV 481 to the first electronic device 410.

In operation 623, the first electronic device 410 may receive an input for controlling the first electronic device 410 using the control information CI. For example, the first electronic device 410 may display a UI included in the control information CI on the display 430. For example, the first electronic device 410 may receive a touch input on the UI.

In operation 625, the first electronic device 410 may transmit a first control signal CS1 for controlling the first UAV 481 to the second electronic device 450 in response to the input (e.g., the touch input on the UI displayed on the display 430).

In operation 627, the second electronic device 450 may transmit a second control signal CS2 corresponding to the first control signal CS1 to the first UAV 481.

In operation 629, the first UAV 481 may be caused to perform a function related to the second control signal CS2 in response to the second control signal CS2. For example, the first UAV 481 may fly within a flyable area in response to the second control signal CS2. The first UAV 481 may capture a picture or video in response to the second control signal CS2.

Figure 7:
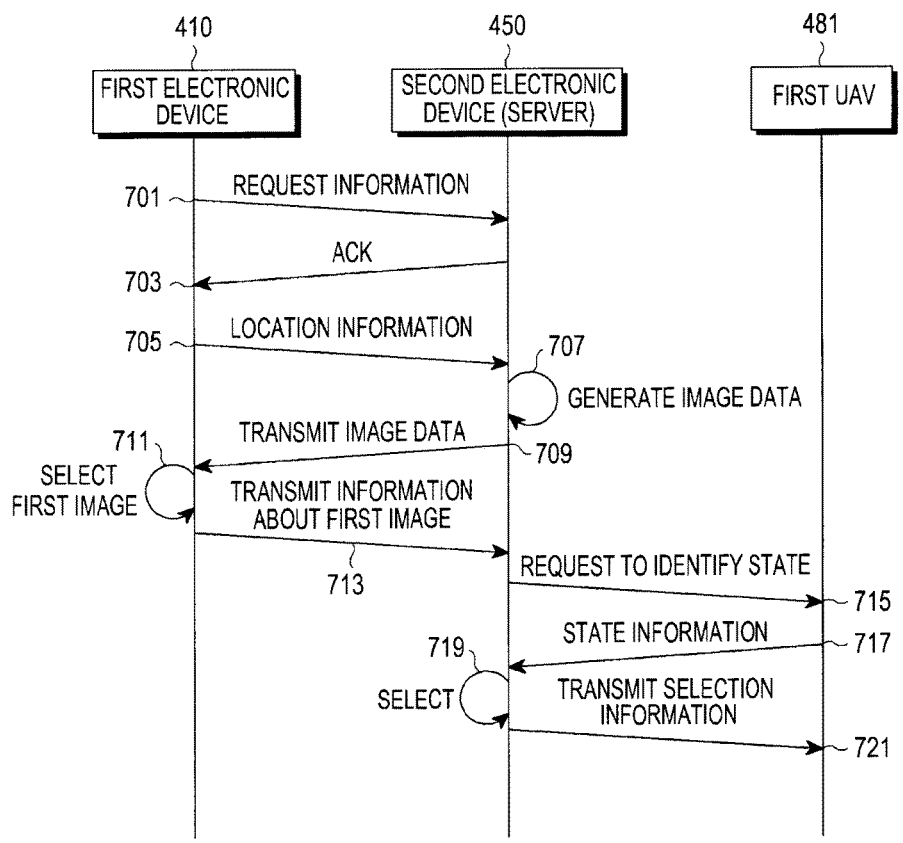
FIG. 7 is a data flowchart illustrating an operation for a second electronic device to select a first UAV according to an embodiment of the present disclosure.

FIG. 7 is a data flowchart illustrating an operation in a second electronic device for selection of a first UAV according to an embodiment of the present disclosure.

Referring to FIG. 7, an electronic system may be implemented substantially the same or similar to the electronic system 400 described above in connection with FIG. 4A. The first electronic device 410 or the second electronic device 450 may be substantially the same or similar to the first electronic device 410 or the second electronic device 450 of FIG. 6.

In operation 701, a first electronic device 410 (e.g., the first electronic device 410 of FIG. 4A or the first electronic device 410 of FIG. 5A) may transmit request information related to controlling a UAV to a second electronic device 450 (e.g., the second electronic device 450 of FIG. 4A or the second electronic device 450 of FIG. 5A).

In operation 703, the second electronic device 450 may transmit a response signal "ACK" to the first electronic device 410 in response to the request information received from the first electronic device 410.

In operation 705, the first electronic device 410, upon receipt of the response signal ACK, may transmit location information "LI" to the second electronic device 450. For example, the first electronic device 410 may transmit, to the second electronic device 450 location information LI indicating the current position of the first electronic device 410 (e.g., information about the coordinates of the position).

In operation 707, the second electronic device 450 may generate or obtain image data "DI" including at least one image related to a function of the UAV in response to the location information LI.

In operation 709, the second electronic device 450 may transmit the image data DI to the first electronic device 410.

In operation 711, the first electronic device 410 may receive the image data DI and select at least one image from among at least one image included in the image data DI. For example, the first electronic device 410 may select a first image from among at least one image.

In operation 713, the second electronic device 450 may receive information DI1 about the first image from the first electronic device 410.

In operation 715, the second electronic device 450 may send a request for identifying respective states of the plurality of UAVs 480 to identify the state of each UAV of the plurality of UAVs 480.

In operation 717, the second electronic device 450 may receive state information from each of the plurality of UAVs 480. For example, the state information may include information about a battery status, whether battery is recharged, whether another function is performed, and/or a function executable for each of the plurality of UAVs 480.

In operation 719, the second electronic device 450 may select the first UAV 481 to perform a function related to the first image based on the state information matching some desirable condition indicated thereof.

In operation 721, the second electronic device 450 may transmit the selection information "SI" to the selected first UAV 481.

Figure 8:
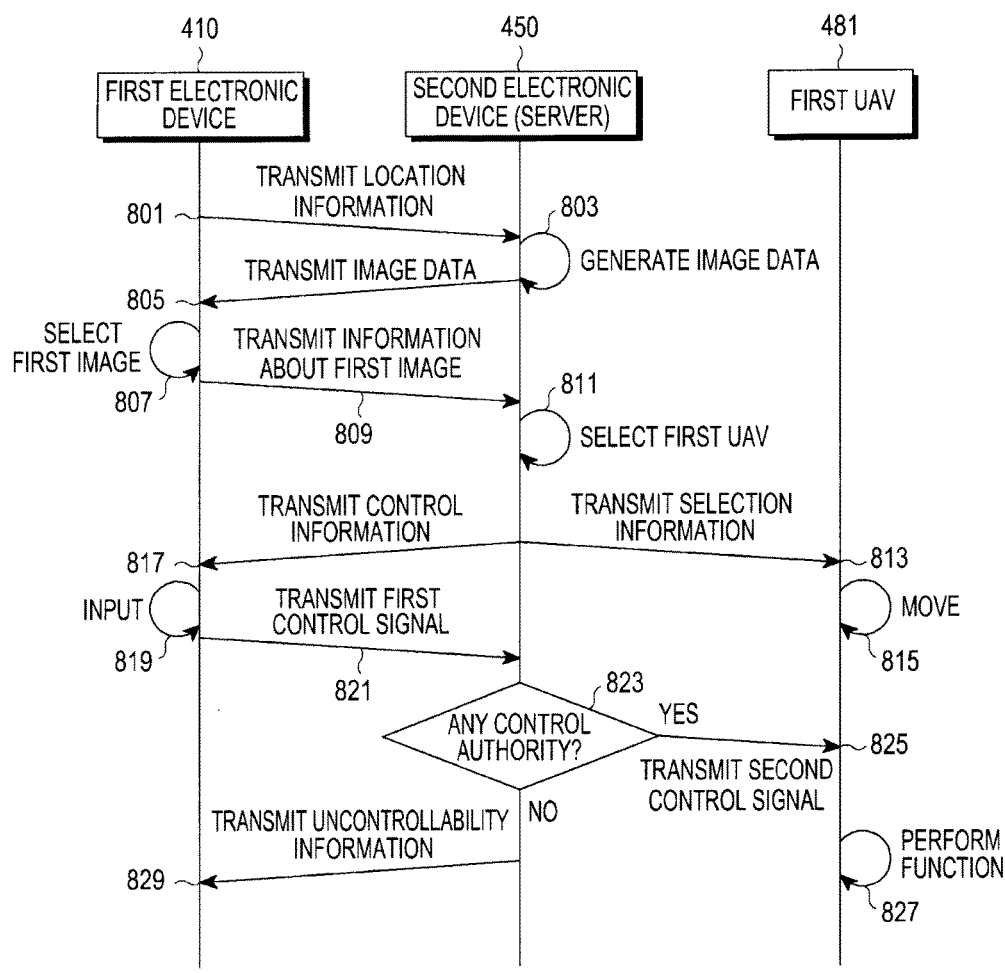
FIG. 8 is a data flowchart illustrating operations of an electronic system according to an embodiment of the present disclosure.

FIG. 8 is a data flowchart illustrating operations of an electronic system according to an embodiment of the present disclosure.

Referring to FIG. 8, the first electronic device 410 or the second electronic device 450 may be substantially the same or similar to the first electronic device 410 or the second electronic device 450 of FIG. 6.

In operation 801, when a first electronic device 410 (e.g., the first electronic device 410 of FIG. 4A or the first electronic device 410 of FIG. 5A) and a second electronic device 450 (e.g., the second electronic device 450 of FIG. 4A or the second electronic device 450 of FIG. 5B) are connected together, the first electronic device 410 may transmit location information LI about the first electronic device 410 to the second electronic device 450.

In operation 803, the second electronic device 450 may generate or obtain image data DI including at least one image related to a function of the UAV based on the location information LI. For example, the image data DI may include an image (e.g., a sample image) that may be captured in the location of the first electronic device 410.

In operation 805, the second electronic device 450 may transmit the image data DI to the first electronic device 410.

In operation 807, the first electronic device 410 may receive the image data DI. The first electronic device 410 may select at least one from among at least one image contained in the image data DI. For example, the first electronic device 410 may select a first image from among at least one image.

In operation 809, the first electronic device 410 may transmit information DI1 about the selected first image to the second electronic device 450.

In operation 811, the second electronic device 450 may select a first UAV 481 (e.g., the first UAV 481 of FIG. 5C) from among the plurality of UAVs 480 based on the information DI1 about the first image.

In operation 813, the second electronic device 450 may transmit the selection information SI to the selected first UAV 481.

In operation 815, the first UAV 481 may move to the location of the first electronic device 410 in response to the selection information SI.

In operation 817, the second electronic device 450 may transmit control information CI for controlling the first UAV 481 to the first electronic device 410.

In operation 819, the first electronic device 410 may receive an input for controlling the first UAV 481 based on the control information CI.

In operation 821, the first electronic device 410 may transmit a first control signal CS1 to the second electronic device 450 in response to an input for controlling the first UAV 481.

In operation 823, the second electronic device 450 may compare the first control signal CS1 with the control authority included in the control information CI.

In operation 825, when the first control signal CS1 is contained in the control authority, the second electronic device 450 may transmit the second control signal CS2 corresponding to the first control signal CS1 to the first UAV 481.

In operation 827, the first UAV 481 may perform a particular function in response to the second control signal CS2.

In operation 829, unless the first control signal CS1 is contained in the control authority, the second electronic device 450 may transmit information indicating uncontrollability to the first electronic device 410. For example, the information indicating uncontrollability may mean information indicating that the first electronic device 410 cannot perform the function corresponding to the first control signal CS1.

Figure 9A:
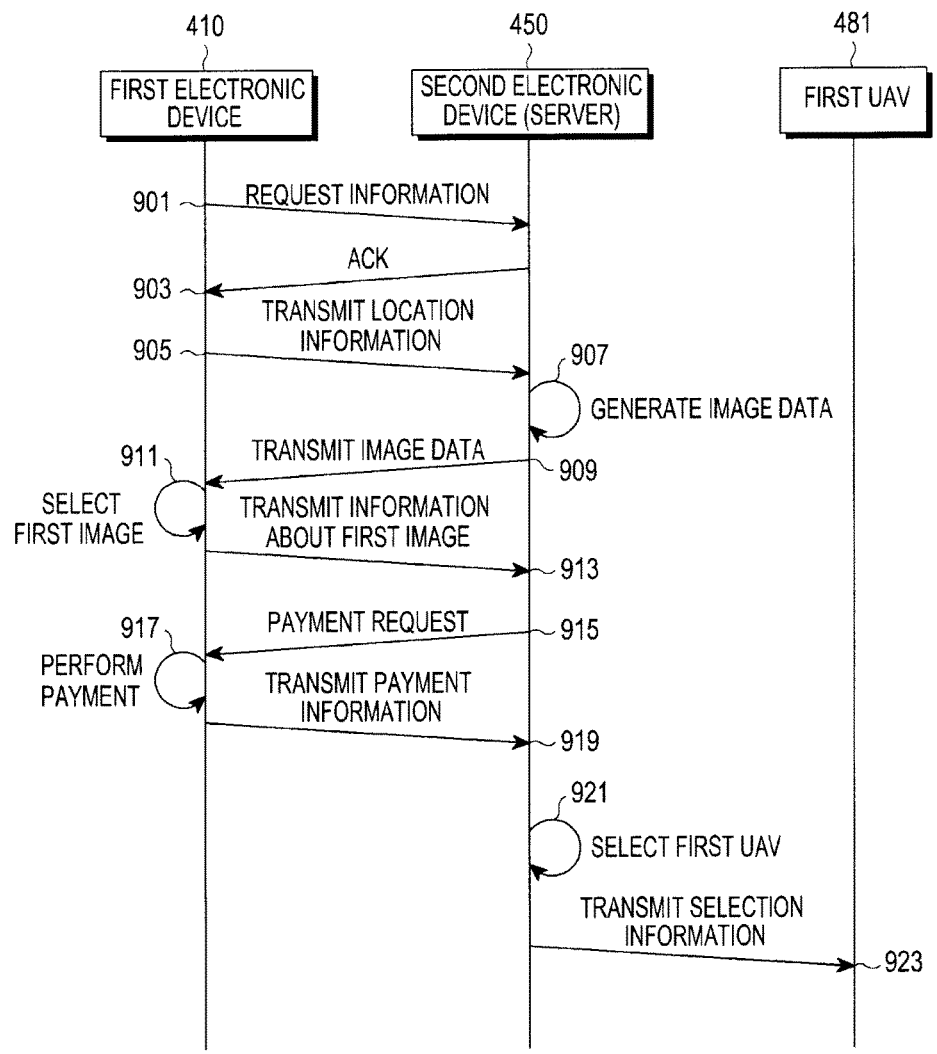
FIG. 9A is a data flowchart illustrating a payment operation of a first electronic device according to an embodiment of the present disclosure.

FIG. 9A is a data flowchart illustrating a payment operation of a first electronic device according to an embodiment of the present disclosure.

Referring to FIG. 9A, the first electronic device 410 or the second electronic device 450 may be substantially the same or similar to the first electronic device 410 or the second electronic device 450 of FIG. 6.

In operation 901, the first electronic device 410 may transmit request information related to controlling a UAV to the second electronic device 450.

In operation 903, the second electronic device 450 may transmit a response signal ACK to the first electronic device 410 in response to the request information received from the first electronic device 410.

In operation 905, the first electronic device 410, upon receipt of the response signal ACK, may transmit location information LI about the first electronic device 410 to the second electronic device 450.

In operation 907, the second electronic device 450 may generate image data DI including at least one image related to a function of the UAV based on the location information LI about the first electronic device 410.

In operation 909, the second electronic device 450 may transmit the image data DI to the first electronic device 410. The second electronic device 450 may also transmit, to the first electronic device 410, information about a function (e.g., an image capturing function) provided using the UAV.

In operation 911, the first electronic device 410 may select at least one from among at least one image contained in the image data DI. For example, the first electronic device 410 may select a first image from among a plurality of images.

In operation 913, the first electronic device 410 may transmit information DI1 about the selected first image to the second electronic device 450.

In operation 915, the second electronic device 450 may send a request for payment to the first electronic device 410 based on the information DI1 about the first image. For example, the second electronic device 450 may send a request for payment related to a fee for performing a function using the first UAV 481 to the first electronic device 410.

In operation 917, the first electronic device 410 may perform a payment operation in response to the payment request.

In operation 919, when the payment operation is performed, the first electronic device 410 may transmit payment information to the second electronic device 450. For example, the payment information may mean information (e.g., information indicating that payment has been complete or that payment has failed) about the payment made by the first electronic device 410. The second electronic device 450 may receive the payment information from the first electronic device 410.

In operation 921, upon identifying that the payment has been complete, the second electronic device 450 may select the first UAV 481.

In operation 923, the second electronic device 450 may selection information SI to the first UAV 481.

Figure 9B:
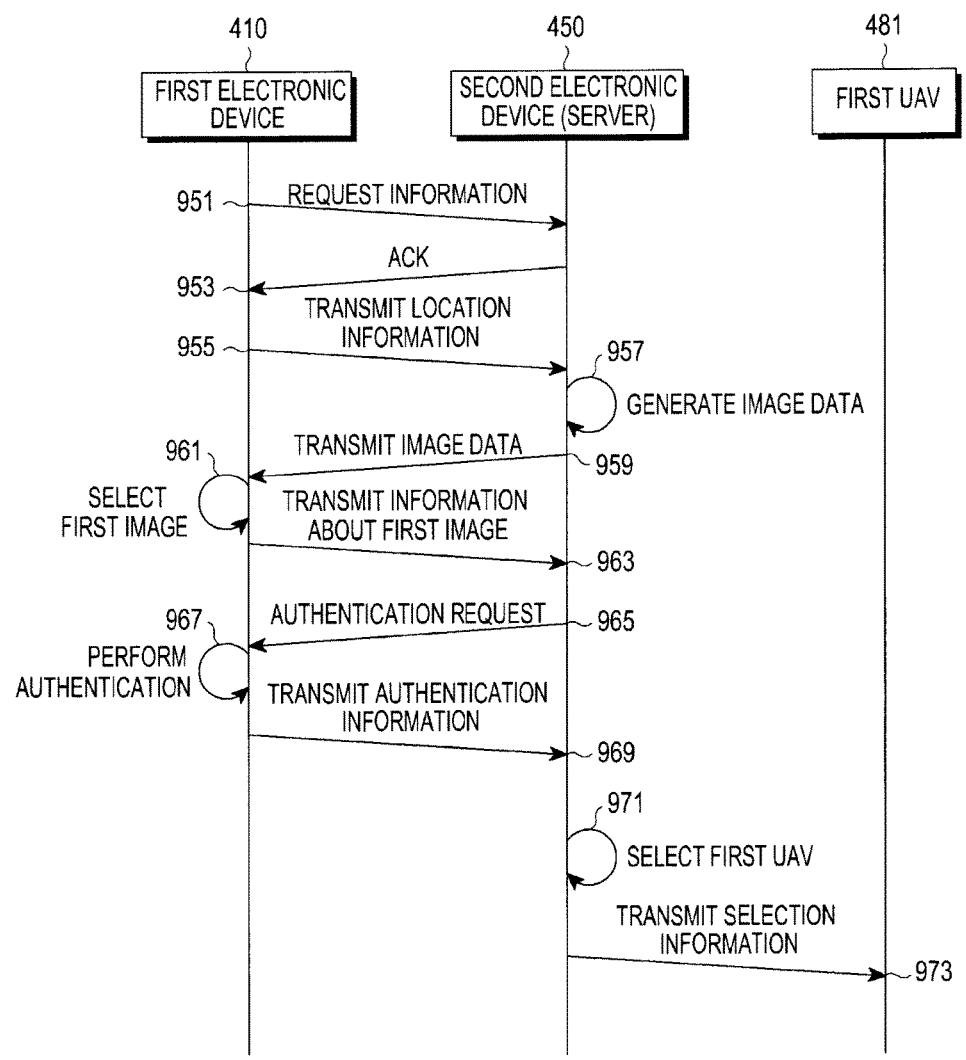
FIG. 9B is a data flowchart illustrating an authentication operation of a first electronic device according to an embodiment of the present disclosure.

FIG. 9B is a data flowchart illustrating an authentication operation of a first electronic device according to an embodiment of the present disclosure.

Referring to FIG. 9B, the first electronic device 410 or the second electronic device 450 may be substantially the same or similar to the first electronic device 410 or the second electronic device 450 of FIG. 6.

In operation 951, the first electronic device 410 may transmit request information related to controlling a UAV to the second electronic device 450.

In operation 953, the second electronic device 450 may transmit a response signal ACK to the first electronic device 410 in response to the request information received from the first electronic device 410.

In operation 955, the first electronic device 410, upon receipt of the response signal ACK, may transmit location information LI about the first electronic device 410 to the second electronic device 450.

In operation 957, the second electronic device 450 may generate image data DI including at least one image related to a function of the UAV based on the location information LI about the first electronic device 410.

In operation 959, the second electronic device 450 may transmit the image data DI to the first electronic device 410. The second electronic device 450 may also transmit, to the first electronic device 410, information about a function (e.g., an image capturing function) provided using the UAV.

In operation 961, the first electronic device 410 may select at least one from among at least one image contained in the image data DI. For example, the first electronic device 410 may select a first image from among a plurality of images.

In operation 963, the first electronic device 410 may transmit information DI1 about the selected first image to the second electronic device 450.

In operation 965, the second electronic device 450 may send a request for authentication to the first electronic device 410 based on the information DI1 about the first image. For example, the second electronic device 450 may send a request for authentication information for performing a function using the first UAV 481 to the first electronic device 410.

In operation 967, the first electronic device 410 may perform an authentication operation in response to the authentication request. For example, the first electronic device 410 may perform the authentication operation by entering identity (ID) information or code information.

In operation 969, when the authentication operation is performed (e.g., when the ID information or code information is entered), the first electronic device 410 may transmit the authentication information to the second electronic device 450. For example, the authentication information may include information indicating that the first electronic device 410 (or the user of the first electronic device 410) may perform a particular function using the first UAV 481. For example, the authentication information may include a code number, a quick response (QR) code, a bar code, and/or ID information. As another example, the authentication information may also include information related to payment for performing a function using the UAV.

In operation 971, the second electronic device 450 may receive the authentication information from the first electronic device 410. The second electronic device 450, upon identifying the authentication information, may select the first UAV 481. Meanwhile, upon failure to identify the authentication information, the second electronic device 450 may transmit a message indicating that the authentication information has not been identified to the first electronic device 410.

In operation 973, the second electronic device 450 may selection information SI to the first UAV 481.

According to an embodiment of the present disclosure, the first electronic device 410 may transmit authentication information, along with request information, to the second electronic device 450. For example, the second electronic device 450 may identify the authentication information received along with the request information. Upon identifying the authentication information, the second electronic device 450 may transmit (acknowledgement) ACK information for the authentication, along with a response signal, to the first electronic device 410.

Figure 10:
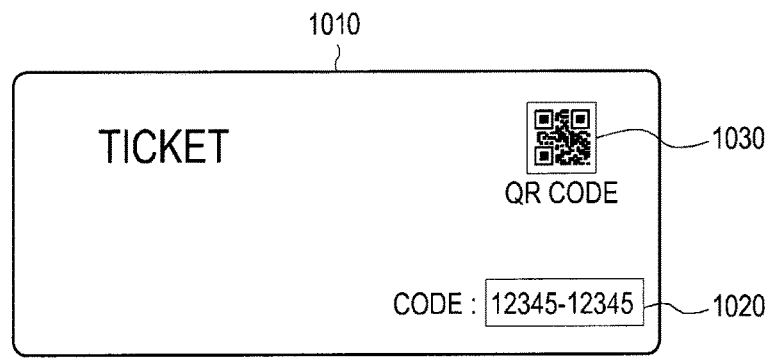
FIG. 10 is a block diagram illustrating an authentication operation of a first electronic device according to an embodiment of the present disclosure.

FIG. 10 is a block diagram illustrating an authentication operation of a first electronic device according to an embodiment of the present disclosure.

Referring to FIG. 10, a ticket 1010 may include a code number 1020 and a QR code 1030. For example, the ticket 1010 may include an electronic ticket and/or a "Giro" ticket.

According to an embodiment of the present disclosure, the first electronic device 410 (e.g., the first electronic device 410 of FIG. 4B or the first electronic device 410 of FIG. 5A) may transmit authentication information, e.g., the code number 1020 or QR code 1030 shown on the ticket 1010, to the second electronic device 450 (e.g., the second electronic device 450 of FIG. 4A or the second electronic device 450 of FIG. 5B).

According to an embodiment of the present disclosure, the second electronic device 450 may analyze the code number 1020 or QR code 1030 and determine a control authority for performing a function using a UAV corresponding to the code number 1020 or QR code 1030. As another example, the second electronic device 450, upon identifying the code number 1020 or QR code 1030, may transmit ACK information regarding the authentication to the first electronic device 410.

According to an embodiment of the present disclosure, the code number 1020 or QR code 1030 may contain information for providing a function such as image capture using a UAV. For example, the second electronic device 450 may analyze the code number 1020 or QR code 1030 and transmit ACK information for authentication indicating that the image capturing function may be provided to the first electronic device 410.

Figure 11A:
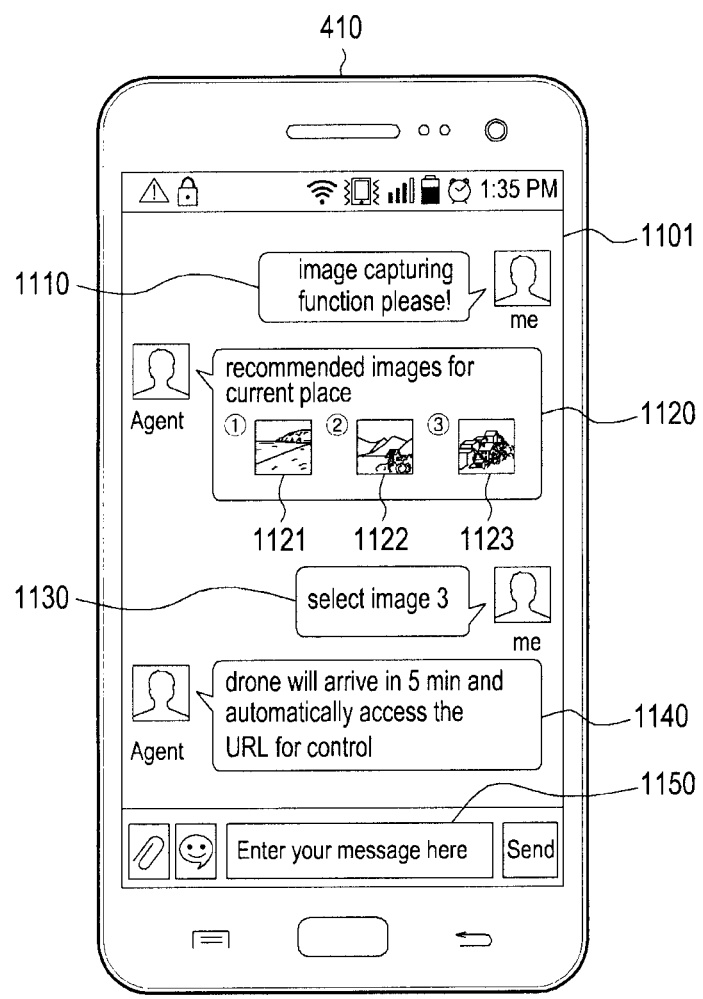
FIG. 11A, FIG. 11B and FIG. 11C are block diagrams illustrating operations of a first electronic device according to an embodiment of the present disclosure.
Figure 11B:
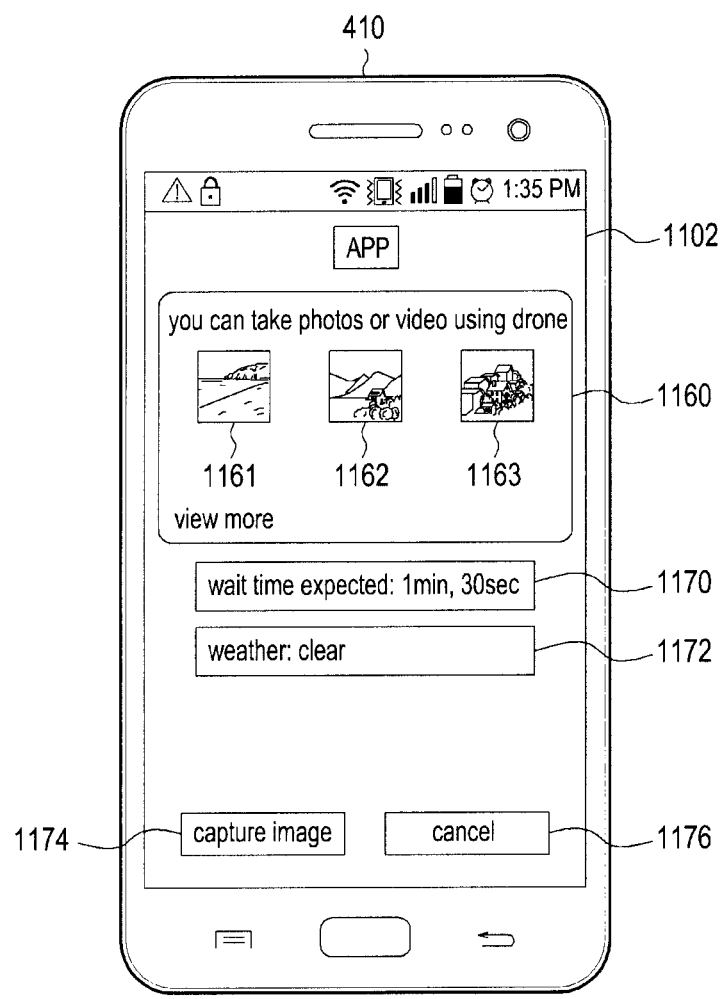
Figure 11C:
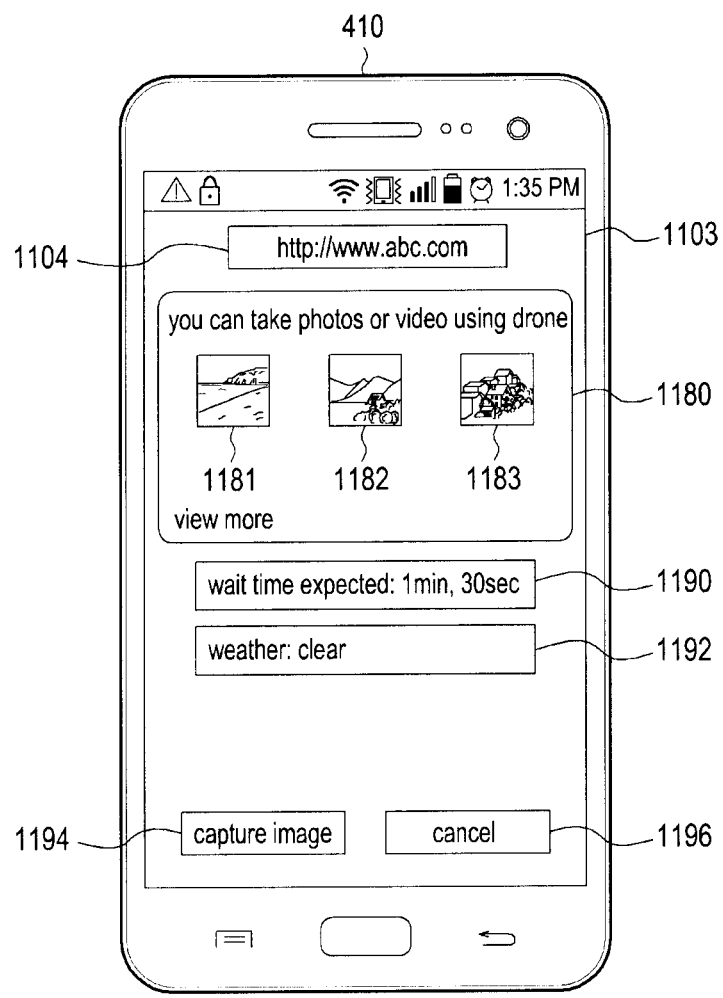

FIG. 11A to FIG. 11C are block diagrams illustrating operations of a first electronic device according to an embodiment of the present disclosure.

Referring to FIG. 11A, a first electronic device 410 (e.g., the first electronic device 410 of FIG. 4A or the first electronic device 410 of FIG. 5A) may display a UI 1101 for communicating with a second electronic device 450 (e.g., the second electronic device 450 of FIG. 4A or the second electronic device 450 of FIG. 5B) using a social media service or social network service (SNS). For example, the first electronic device 410 may communicate with the second electronic device 450 using a "chatbot."

According to an embodiment of the present disclosure, the first electronic device 410 may display 430 a chatting window of the SNS on the display 430. The first electronic device 410 may transmit information entered through an input window 1150 to the second electronic device 450.

According to an embodiment of the present disclosure, the first electronic device 410 may transmit request 1110 information to the second electronic device 450 (e.g., a text message stating "image capturing function please"). For example, the first electronic device 410 may transmit the request information 1110 for requesting an 'image capturing function' to the second electronic device 450.

According to an embodiment of the present disclosure, the first electronic device 410 may receive information related to a function that a UAV provides from the second electronic device 450. For example, the first electronic device 410 may receive image data DI including a plurality of images 1121, 1122, and 1123 related to the function of the first UAV 481. The first electronic device 410 may display, on the display 430, information 1120 related to the function of the first UAV 481 including the plurality of images 1121, 1122, and 1123.

According to an embodiment of the present disclosure, the first electronic device 410 may select the function of the first UAV 481. For example, the first electronic device 410 may select any one 1123 from among the plurality of images 1121, 1122, and 1123 by generating a response message reciting "select image 3". The first electronic device 410 may transmit information about the selected image 1123 to the second electronic device 450. For example, upon receiving an input 1130 for selecting a third image, the first electronic device 410 may transmit information about the selected third image 1123 to the second electronic device 450.

According to an embodiment of the present disclosure, the first electronic device 410 may receive control information "CI" about the first UAV 481 (e.g., the first UAV 481 of FIG. 5C). For example, the first electronic device 410 may display, on the display 430, information about the first UAV 481 providing the image capture function exemplified by the selected image, such as the responsive text message 1140.

Referring to FIG. 11B, the first electronic device 410 may communicate with the second electronic device 450 using an application. The first electronic device 410 may execute an application for requesting a function using a UAV. When the application is executed, the first electronic device 410 may display a UI 1102 for the application on the display 430.

According to an embodiment of the present disclosure, the first electronic device 410 may receive information indicating one or more functions provided by the first UAV 481 from the second electronic device 450. For example, the first electronic device 410 may receive image data "DI" including a plurality of images 1161, 1162, and 1163 related to the function provided by the first UAV 481. As another example, the first electronic device 410 may display, on the display 430, information 1160 related to the function of the first UAV 481 including the plurality of images 1161, 1162, and 1163.

According to an embodiment of the present disclosure, the first electronic device 410 may select one of the functions of the first UAV 481 for execution. For example, the first electronic device 410 may select any one from among the plurality of images 1161, 1162, and 1123. The first electronic device 410 may transmit information indicating the selected image to the second electronic device 450. For example, when any one is selected from among the plurality of images 1161, 1162, and 1163, the first electronic device 410 may transmit, to the second electronic device 450, information indicating the image selected when detecting selection of the "capture image" button 1174. The first electronic device 410 may cancel the selection of any one of the plurality of images 1161, 1162, and 1163 when detecting selection of a "cancel" button 1176.

According to an embodiment of the present disclosure, the first electronic device 410 may receive control information CI about the first UAV 481. For example, the first electronic device 410 may display, on the display 430, information about a function that the first UAV 481 may provide. For example, when any one of the plurality of images 1161, 1162, and 1163 is selected, the first electronic device 410 may display additional information pertaining to the functions performed by the UAV. For example, information 1170 about 'wait time expected' on the display 430, indicating an estimated arrival time of the UAV. The first electronic device 410 may also display information 1172 about 'current weather' on the display 430, which may be beneficial to indicate a likely outcome of the image capture.

Referring to FIG. 11c, the first electronic device 410 may access a webpage 1104 to communicate with the second electronic device 450. The first electronic device 410 may access the webpage to send a request for a control authority for performing a particular function using a UAV. Upon accessing the webpage, the first electronic device 410 may display a UI 1103 for the webpage on the display 430.

According to an embodiment of the present disclosure, the first electronic device 410 may receive information about the function using the first UAV 481 from the second electronic device 450. For example, the first electronic device 410 may receive image data DI including a plurality of images 1181, 1182, and 1183 related to the function provided by the first UAV 481. The first electronic device 410 may display, on the display 430, information 1180 about the function provided by the UAV including the plurality of images 1181, 1182, and 1183.

According to an embodiment of the present disclosure, the first electronic device 410 may select a function provided by the UAV. For example, the first electronic device 410 may select any one from among the plurality of images 1181, 1182, and 1183. The first electronic device 410 may transmit information about the selected image to the second electronic device 450. For example, when any one is selected from among the plurality of images 1181, 1182, and 1183, the first electronic device 410 may transmit, to the second electronic device 450, information about the image selected by detecting selection of a 'request to capture image' button 1194. As another example, the first electronic device 410 may cancel the selection of any one of the plurality of images 1181, 1182, and 1183 by detecting selection of a 'cancel' button 1196.

According to an embodiment of the present disclosure, the first electronic device 410 may receive control information CI about the first UAV 481. For example, the first electronic device 410 may display, on the display 430, information indicating a function that the first UAV 481 may provide. For example, when any one of the plurality of images 1181, 1182, and 1183 is selected, the first electronic device 410 may display information 1190 about 'wait time expected' on the display 430. The first electronic device 410 may also display information 1192 about 'current weather' on the display 430.

Figure 12:
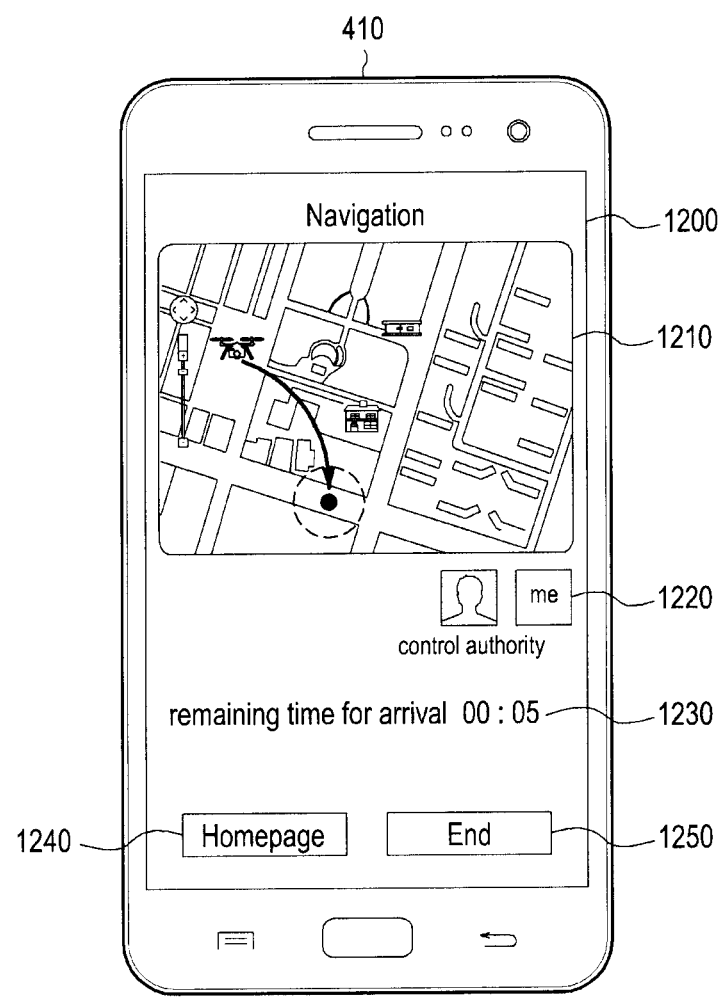
FIG. 12 is a block diagram illustrating operations of a first electronic device according to an embodiment of the present disclosure.

FIG. 12 is a block diagram illustrating information about a first UAV that is displayed on a first electronic device according to an embodiment of the present disclosure.

Referring to FIG. 12, a first electronic device 410 (e.g., the first electronic device 410 of FIG. 4A or the first electronic device 410 of FIG. 5A) may receive control information CI for a first UAV 481 (e.g., the first UAV 481 of FIG. 5C) from a second electronic device 450 (e.g., the second electronic device 450 of FIG. 4B or the second electronic device 450 of FIG. 5B).

The second electronic device 450 may select a first UAV 481 from among a plurality of UAVs 480 (e.g., the plurality of UAVs 480 of FIG. 4A). As another example, the second electronic device 450 may transmit selection information SI for the first UAV 481 to move to the location of the first electronic device 410.

According to an embodiment of the present disclosure, the first electronic device 410 may display, on the display 430, information 1200 about the first UAV 481 included in the control information CI. For example, the first electronic device 410 may display information 1210, such as a map, indicating the location of the first UAV 481 on the display 430. The first electronic device 410 may further display information 1220 indicating who has controlling authority for the first UAV 481 on the display 430. The first electronic device 410 may display a remaining time 1230 for the first UAV 481 to reach the location of the first electronic device 410. The first electronic device 410 may also display a 'home page' button 1240 selectable to retrieve information about the first UAV 481 and/or a particular function using the first UAV 481, and a selectable 'end' button 1250 to terminate control of the UAV.

Figure 13A:
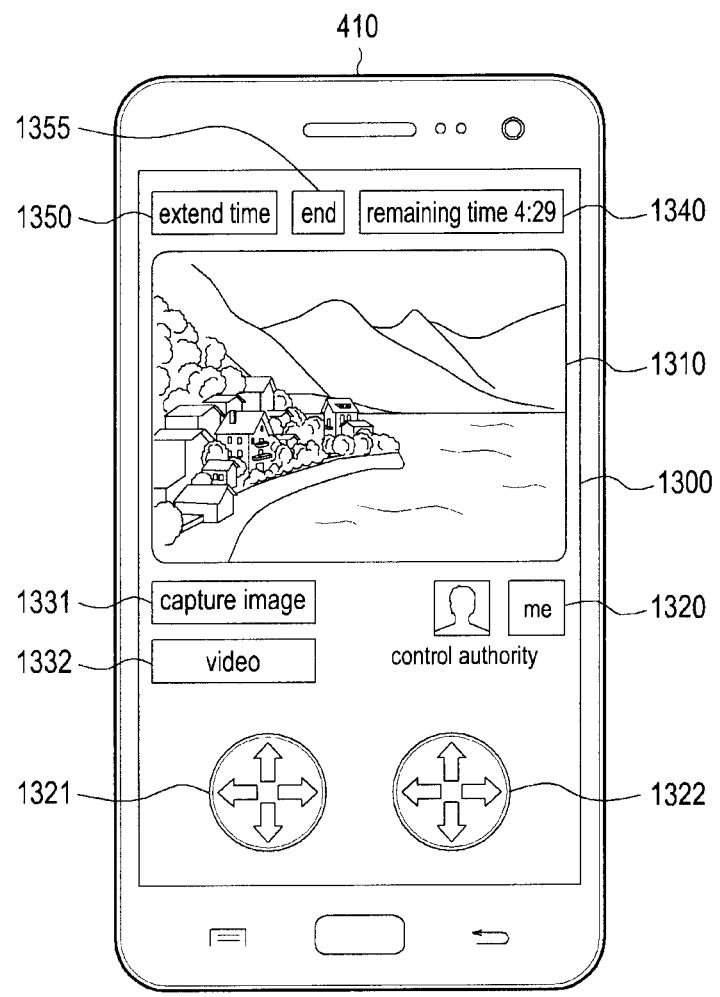
FIG. 13A and FIG. 13B are block diagrams illustrating operations of a first electronic device according to an embodiment of the present disclosure.
Figure 13B:
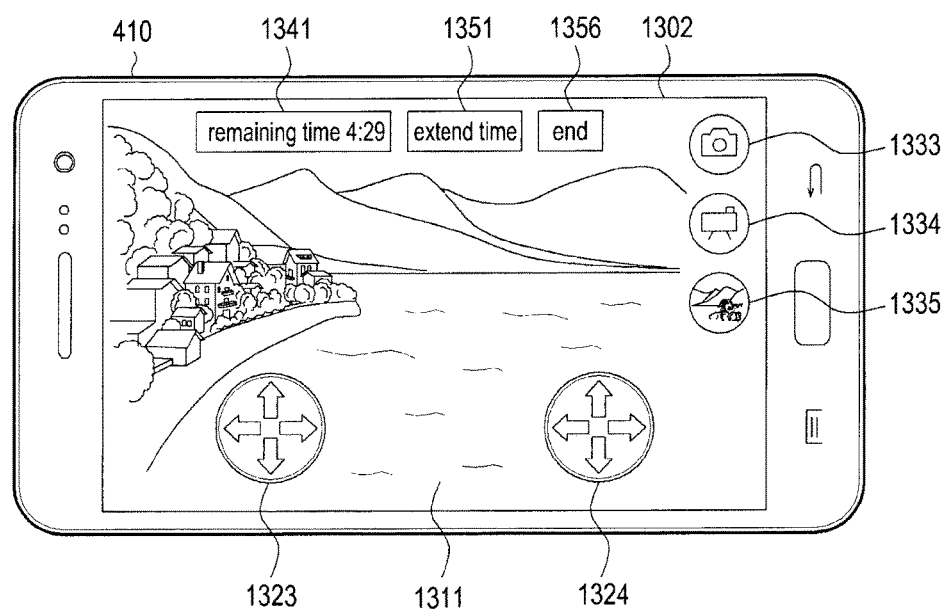

FIG. 13A and FIG. 13B are block diagrams illustrating operations of a first electronic device according to an embodiment of the present disclosure.

Referring to FIG. 13A, a first electronic device 410 (e.g., the first electronic device 410 of FIG. 4A or the first electronic device 410 of FIG. 5A) may display, on a display 430, a UI 1300 for controlling a first UAV 481 (e.g., the first UAV 481 of FIG. 5C) based on control information CI. For example, the first electronic device 410 may display a UI 1310 for controlling the first UAV 481 on the display 430 in a portrait mode.

According to an embodiment of the present disclosure, the UI 1300 may include a screen 1310 for an image captured by the first UAV 481, control authority information 1320, a first controller 1321, a second controller 1322, a capture button 1331, a video button 1332, remaining time information 1340, an extend time button 1350, and an end button 1355.

According to an embodiment of the present disclosure, the first electronic device 410 may display an image currently captured by the first UAV 481 on the screen 1310.

According to an embodiment of the present disclosure, the first electronic device 410 may display information about a current control authority for the first UAV 481 on the control authority information 1320. For example, when the first electronic device 410 has a control authority for the first UAV 481, the first electronic device 410 may display a "Me" as the entity having the control authority.

According to an embodiment of the present disclosure, the first electronic device 410 may display the first controller 1321 and/or the second controller 1322 to control the first UAV 481. For example, in response to an input from each of the first controller 1321 and/or the second controller 1322, the first electronic device 410 may transmit a first control signal CS1 for controlling the first UAV 481 to a second electronic device 450 (e.g., the second electronic device 450 of FIG. 4A or the second electronic device 450 of FIG. 5B). For example, the first controller 1321 may include selectable options for controlling 'throttle up," "throttle down," "yaw left," and "yaw right" on the first UAV 481. The second controller 1322 may include selectable options for controlling "pitch up," "pitch down," "roll left," and "roll right" on the first UAV 481.

According to an embodiment of the present disclosure, the first electronic device 410 may display the capture button 1331 and/or video button 1332 to control the first UAV 481 to take an image or video. For example, the capture button 1331 may include a button selectable to capture a still image using the first UAV 481, and the video button 1332 may include a button selectable to capture video footage using the first UAV 481.

According to an embodiment of the present disclosure, the first electronic device 410 may display the remaining time information 1340 about an available time (e.g., a remaining rental time available for the capturing function) for a control authority for controlling the first UAV 481, the extend time button 1350 for extending the available time for possessing the control authority for controlling the first UAV 481 (e.g., a rental time), and the end button 1355 for terminating control over the first UAV 481.

Referring to FIG. 13B, the first electronic device 410 may display a UI 1302 for controlling the first UAV 481 on the display 430 in a landscape mode.

The UI 1302 of FIG. 13B may be substantially the same or similar to the UI 1300 of FIG. 13A except for the orientation of display, which in FIG. 13B is in a landscape mode.

The UI 1311 may include a screen 1311 for an image captured by the first UAV 481, a first controller 1323, a second controller 1324, a still-image capture button 1333, a video capture button 1334, a panorama capture button 1335, remaining time information display 1341, a time extension button 1351, and an end button 1356.

The UI 1311 may be implemented to be substantially the same or similar to the UI 1300 of FIG. 13A except for the presence of the capture panorama button 1335.

The first electronic device 410 may display, on the display 430, the capture panorama button 1335 for controlling the first UAV 481 to take a panoramic image. For example, the capture panorama button 1335 may mean a button for taking a panoramic still image using the first UAV 481.

For example, the first electronic device 410 may display the capture panorama button 1335 using the first UAV 481 when the control authority of the control information CI includes a panorama capturing function.

According to an embodiment of the present disclosure, the UI 1300 which is displayed in a portrait mode as shown in FIG. 13A may also display a capture panorama button 1335 for the first UAV 481. For example, the first electronic device 410 may display the capture panorama button 1335 using the first UAV 481 when the control authority of the control information CI includes a panorama capturing function.

Figure 14:
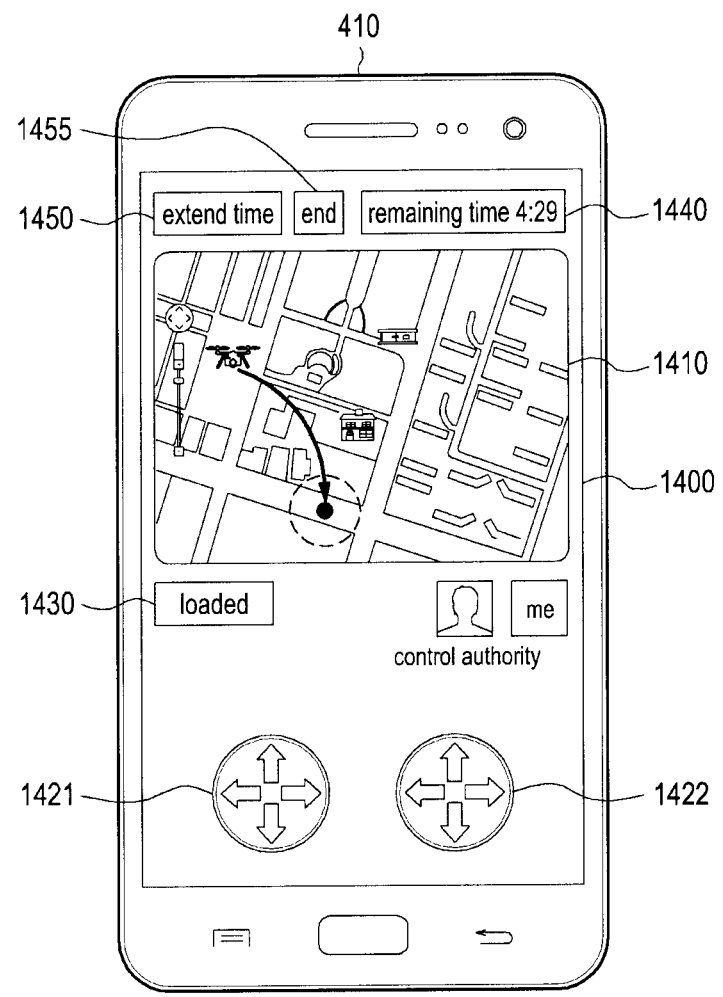
FIG. 14 is a block diagram illustrating operations of a first electronic device according to an embodiment of the present disclosure.

FIG. 14 is a block diagram illustrating operations of a first electronic device according to an embodiment of the present disclosure.

Referring to FIG. 14, a first electronic device 410 (e.g., the first electronic device 410 of FIG. 4A or the first electronic device 410 of FIG. 5A) may perform a particular function using a first UAV 481 (e.g., the first UAV 481 of FIG. 5C).

According to an embodiment of the present disclosure, the first electronic device 410 may control product delivery using a first UAV 481 through a second electronic device 450 (e.g., the second electronic device 450 of FIG. 4A or the first electronic device 410 of FIG. 5B).

According to an embodiment of the present disclosure, the first electronic device 410 may display a UI 1400 for product delivery on the display 430.

According to an embodiment of the present disclosure, the first electronic device 410 may display a map 1410 to indicate the status of the product delivery. For example, the first electronic device 410 may display the traveling route and current location of the first UAV 481 on the map 1410.

According to an embodiment of the present disclosure, the first electronic device 410 may display the first controller 1421 and/or the second controller 1422 to control the first UAV 481 through the second electronic device 450. For example, the first electronic device 410 may control the first UAV 481 in response to an input to the first controller 1421 and/or the second controller 1422.

According to an embodiment of the present disclosure, the first electronic device 410 may display a 'loaded' button 1430. For example, when a product for delivery is loaded on the first UAV 481, the first electronic device 410 may receive an input to the 'loaded' button 1430 by the user. In response to the input to the 'loaded' button 1430, the first electronic device 410 may start the product delivery using the first UAV 481. The product delivery using the first UAV 481 may be performed under the control of the first electronic device 410 or by the second electronic device 450.

According to an embodiment of the present disclosure, the first electronic device 410 may also display an 'extend time' button 1450 for extending the control authority for the first UAV 481 and/or an 'end' button 1455 for terminating the control authority. The first electronic device 410 may also display the 'remaining time' information 1440 about the control authority using the first UAV 481.

Figure 15A:
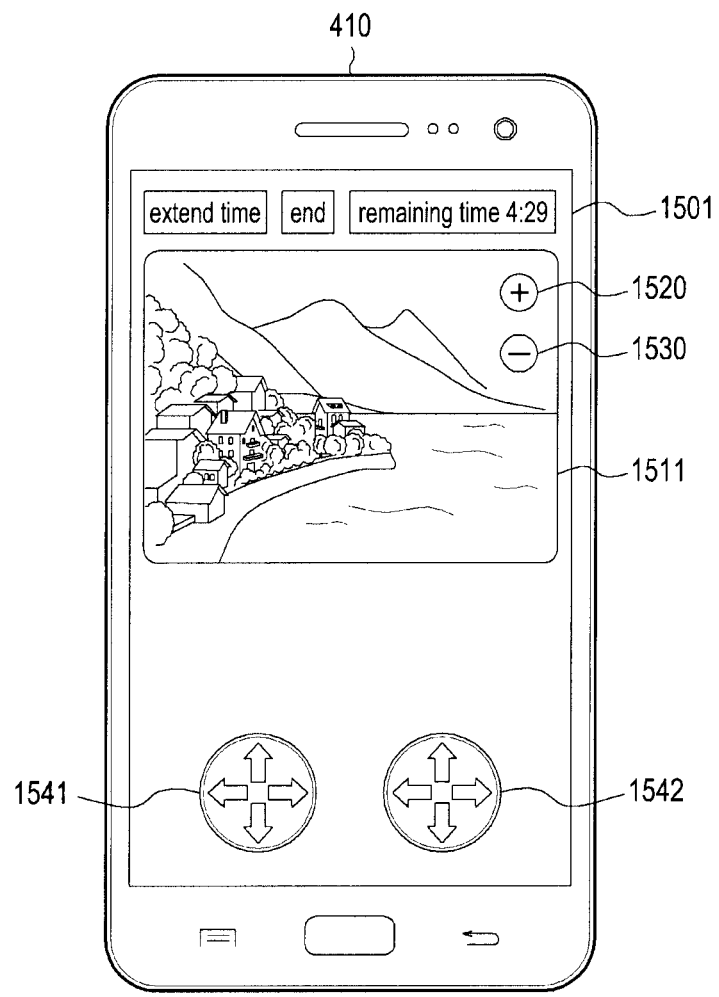
FIG. 15A.
Figure 15B:
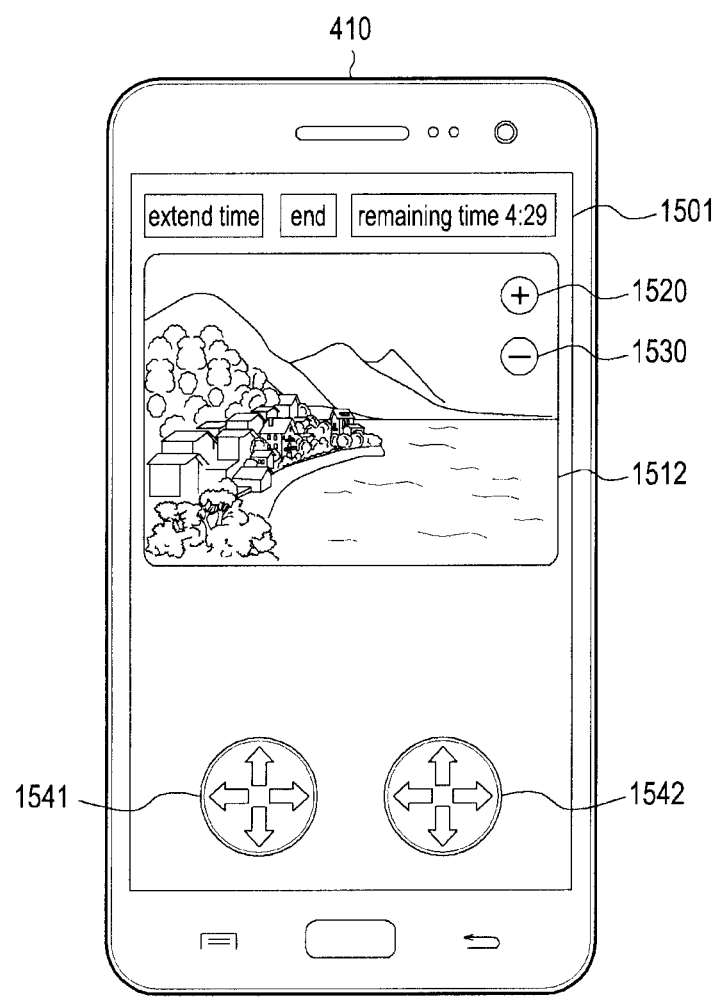
FIG. 15B and FIG. 15C are block diagrams illustrating operations of a first electronic device according to an embodiment of the present disclosure.
Figure 15C:
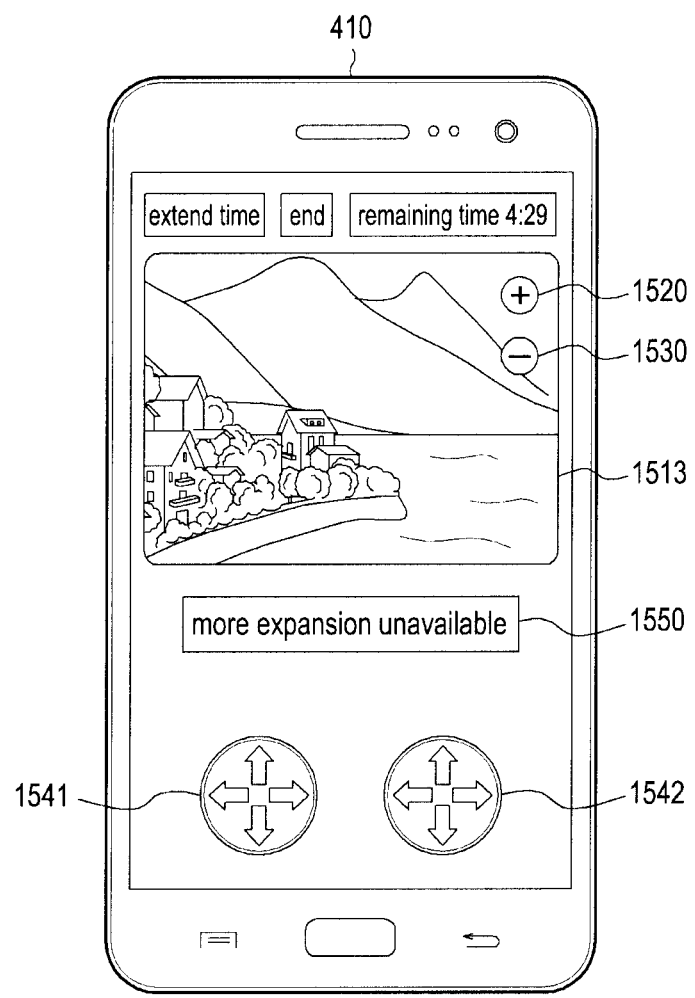

FIG. 15A to FIG. 15C are block diagrams illustrating operations of a first electronic device according to an embodiment of the present disclosure.

Referring to FIG. 15A, a first electronic device 410 may perform a particular function using a first UAV 481.

According to an embodiment of the present disclosure, the first electronic device 410 (e.g., the first electronic device 410 of FIG. 4A or the first electronic device 410 of FIG. 5A) may capture images using a first UAV 481 (e.g., the first UAV 481 of FIG. 5C).

According to an embodiment of the present disclosure, the first electronic device 410 may display a UI 1501 on the display 430. The first electronic device 410 may display an image 1511 captured using the first UAV 481 on the display 430.

According to an embodiment of the present disclosure, the first electronic device 410 may enlarge or shrink the image 1511 captured by the first UAV 481. For example, the first electronic device 410 may enlarge or shrink the image 1511 captured by the first UAV 481 in response to detecting an input selecting either an enlarge button 1520 or a shrink button 1530 (e.g., zoom in or zoom out).

For example, the first electronic device 410 may enlarge or shrink the image 1511 captured by the first UAV 481 in response to an input to a first controller 1541 and/or a second controller 1542. For example, the first electronic device 410 may enlarge or shrink the captured image 1511 by adjusting the position of the first UAV 481 in response to an input to a first controller 1541 and/or a second controller 1542.

Referring to FIG. 15B, the first electronic device 410 may shrink the image 1511 captured by the first UAV 481 and display a shrunken image 1512. For example, the first electronic device 410 may display the image 1512 shrunken from the image 1511 captured by the first UAV 481 in response to an input to the shrink button 1530.

Referring to FIG. 15C, the first electronic device 410 may enlarge the image 1511 captured by the first UAV 481 and display an enlarged image 1513. For example, the first electronic device 410 may display the image 1513 enlarged from the image 1511 captured by the first UAV 481 in response to an input to the enlarge button 1520.

According to an embodiment of the present disclosure, the first electronic device 410 may control the first UAV 481 within the control authority included in the control information CI. For example, when the control authority for enlarging images captured using the first UAV 481 is limited, the first electronic device 410 may enlarging images within the control authority. For example, upon receipt of an image enlarging request which is out of the control authority, the first electronic device 410 may display an informational window 1550 indicating that further enlargement of the image is not available. Upon receipt of an image shrinking request which is out of the control authority, the first electronic device 410 may display a notification to indicate that shrinking images is not available.

Figure 16A:
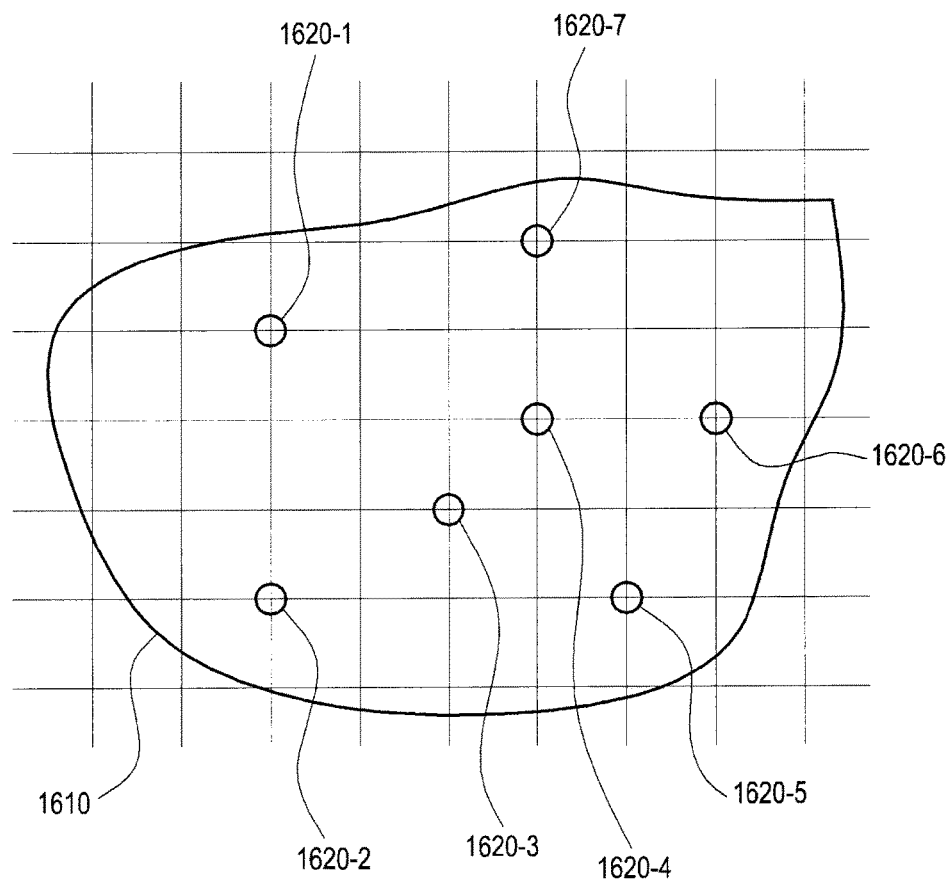
FIG. 16A and FIG. 16B are block diagrams illustrating an operation for setting up a flyable area of a first UAV by a second electronic device according to an embodiment of the present disclosure.
Figure 16B:
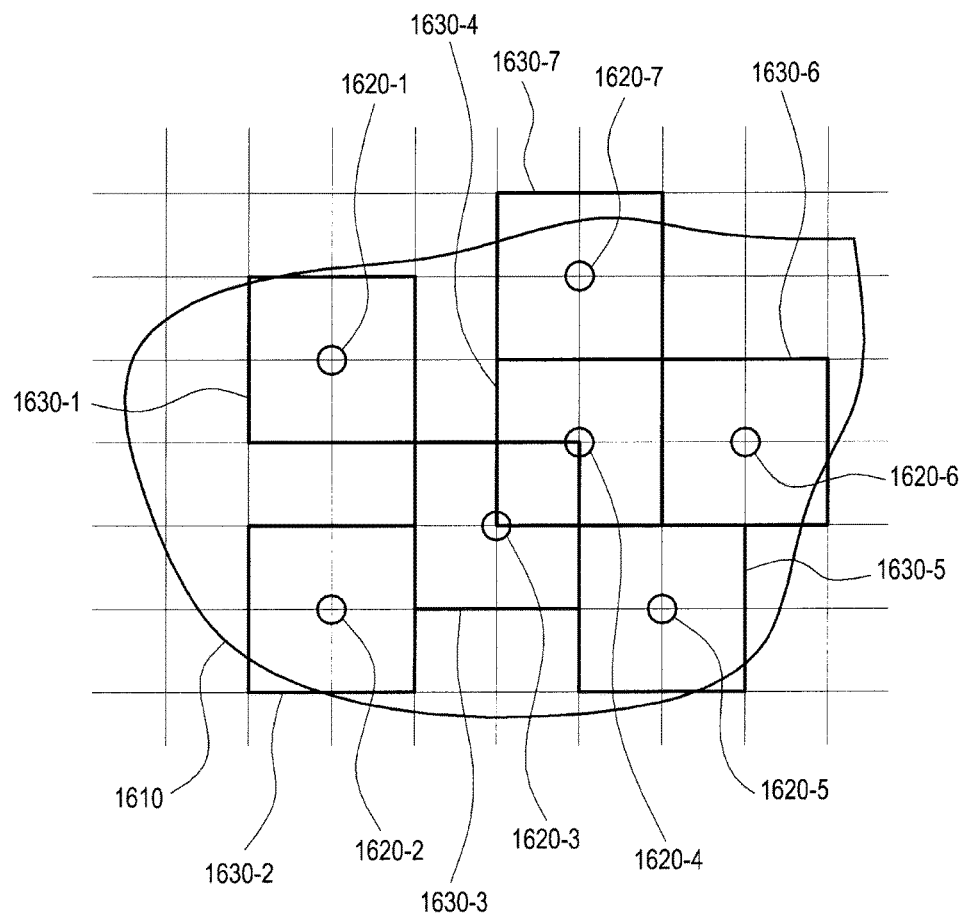

FIGS. 16A and 16B are block diagrams illustrating an operation for setting up a flyable area of a first UAV by a second electronic device according to an embodiment of the present disclosure.

Referring to FIGS. 16A and 16B, a second electronic device 450 (e.g., the second electronic device 450 of FIG. 4A or the second electronic device 450 of FIG. 5B) may set a flyable area for a first UAV 481 (e.g., the first UAV 481 of FIG. 5C) based on the location of a first electronic device 410 (e.g., the first electronic device 410 of FIG. 4A or the first electronic device 410 of FIG. 5B).

Referring to FIG. 16A, the second electronic device 450 may set a particular flight area 1610 for each of a plurality of UAVs 480 (e.g., the plurality of UAVs 480 of FIG. 4A) indicating a region in which a number of UAVs are permitted to fly.

According to an embodiment of the present disclosure, the second electronic device 450 may determine the locations 1620-1 to 1620-7 of first electronic devices within the flight area 1610. For example, the second electronic device 450 may receive location information about the first electronic devices within the flight area and determine the locations 1620-1 to 1620-7 of the first electronic devices based on the location information.

Referring to FIG. 16B, the second electronic device 450 may set flyable areas 1630-1 to 1630-7 based on the locations of the first electronic devices. For example, the second electronic device 450 may set the flyable areas 1630-1 to 1630-7 each of which corresponds to one of the respective locations 1620-1 to 1620-7 of the first electronic devices. For example, the second electronic device 450 may set areas that reach a predetermined distance (e.g., in a left, right, upper, or lower direction) from the locations 1620-1 to 1620-7 of the plurality of first electronic devices as the flyable areas 1630-1 to 1630-7.

According to an embodiment of the present disclosure, when the set flyable areas 1630-1 to 1630-7 overlap, the second electronic device 450 may control each of the plurality of UAVs 480 to avoid mid-air collisions.

Figure 17A:
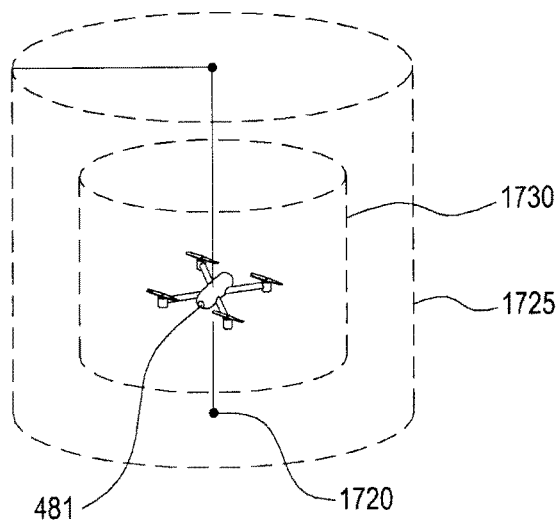
FIG. 17A and FIG. 17B are block diagrams illustrating a flyable area of a first UAV according to an embodiment of the present disclosure.
Figure 17B:
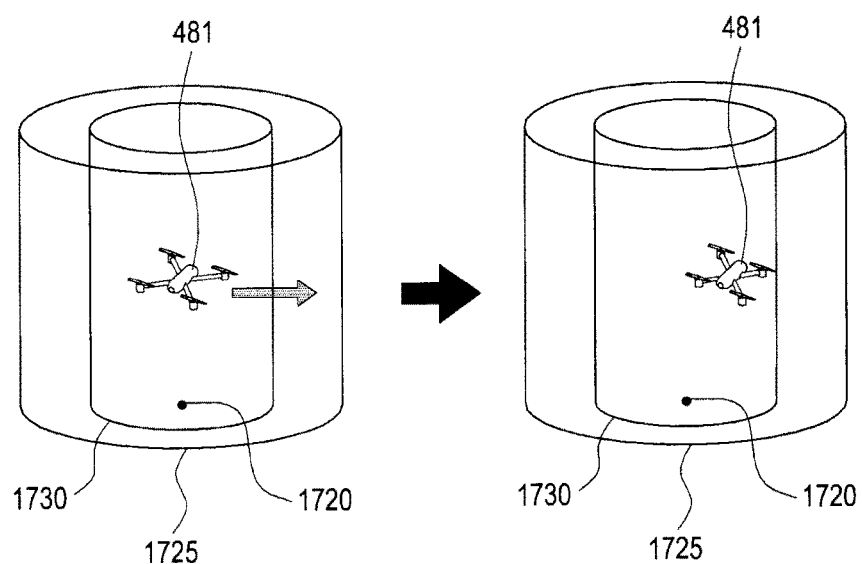

FIGS. 17A and 17B are block diagrams illustrating a flyable area of a first UAV according to an embodiment of the present disclosure.

Referring to FIG. 17A, a second electronic device 450 (e.g., the second electronic device 450 of FIG. 4A or the second electronic device 450 of FIG. 5B) may set an area extending a predetermined distance (e.g., in a left, right, upper, and/or lower direction) from the location 1720 of a first electronic device 410 (e.g., the first electronic device 410 of FIG. 4A or the first electronic device 410 of FIG. 5A) as a flyable area 1730 of a first UAV 481 (e.g., the first UAV 481 of FIG. 5C).

According to an embodiment of the present disclosure, the second electronic device 450 may set a non-flyable area 1725 where both the first UAV 481 and other UAVs are prohibited from flying, thereby preventing collisions between the first UAV 481 and the other UAVs.

Referring to FIG. 17B, the second electronic device 450 may set the flyable area 1730 within which the first UAV 481 is allowed to fly.

According to an embodiment of the present disclosure, even when receiving a first control signal CS1 to cause the first UAV 481 to depart from the flyable area 1730 from the first electronic device 410, the second electronic device 450 may control the first UAV 481 to fly within the flyable area 1730. For example, the second electronic device 450 may control the first UAV 481 to fly within the flyable area 1730 but not the non-flyable area 1725.

Figure 18:
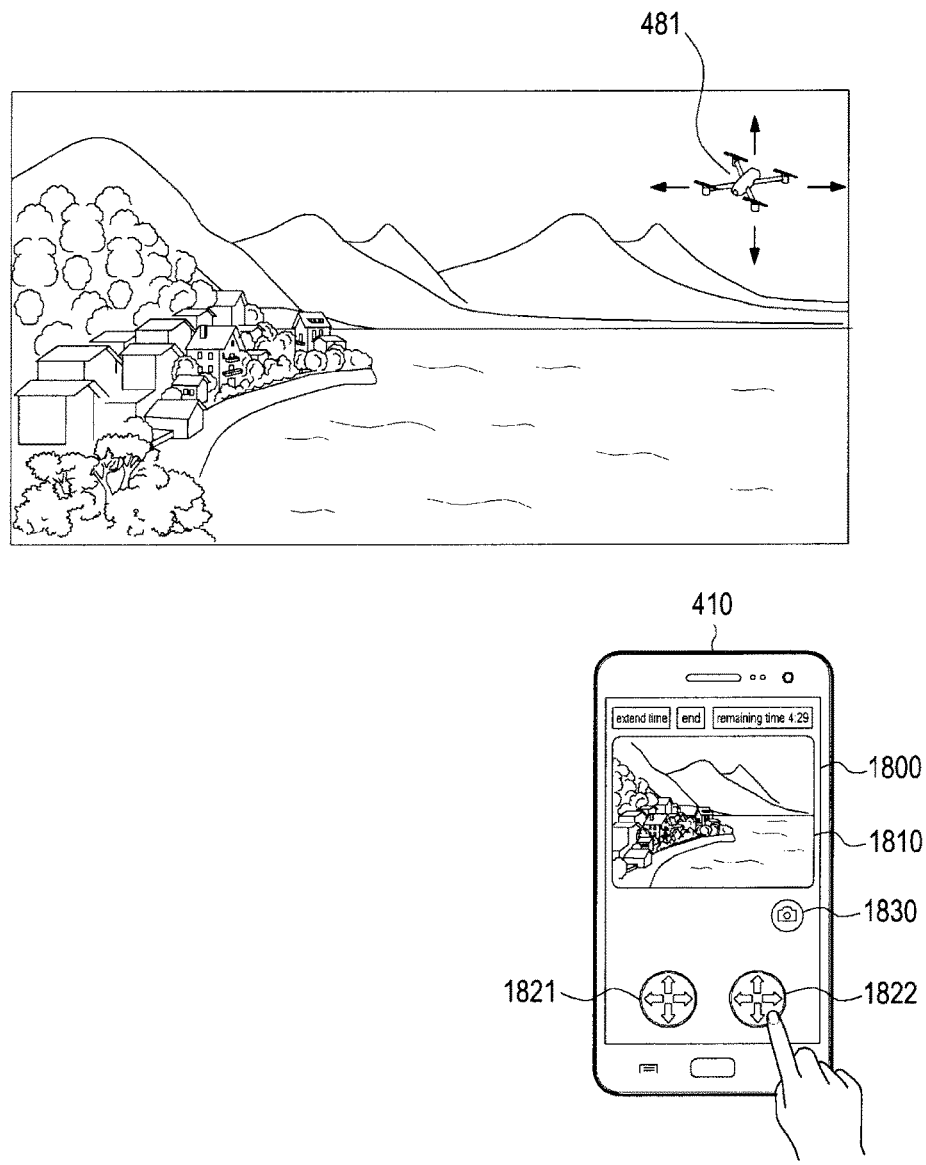
FIG. 18 is a block diagram illustrating operations of an electronic system according to an embodiment of the present disclosure.

FIG. 18 is a block diagram illustrating operations of an electronic system according to an embodiment of the present disclosure.

Referring to FIG. 18, a first electronic device 410 (e.g., the first electronic device 410 of FIG. 4A or the first electronic device 410 of FIG. 5A) may control a first UAV 481 (e.g., the first UAV 481 of FIG. 5C) through a second electronic device 450 (e.g., the second electronic device 450 of FIG. 4B or the second electronic device 450 of FIG. 5B), capturing an image.

According to an embodiment of the present disclosure, the first electronic device 410 may display a UI 1800 for controlling the first UAV 481.

According to an embodiment of the present disclosure, the first electronic device 410 may display the image captured by the first UAV 481 on a first screen 1810 included in the UI 1800.

According to an embodiment of the present disclosure, the first electronic device 410 may move the first UAV 481 based on inputs to a first controller 1821 and a second controller 1822 included in the UI 1800.

According to an embodiment of the present disclosure, the first electronic device 410 may capture an image using a camera module 495 included in the first UAV 481 based on an input to a capture image button 1830 included in the UI 1800. For example, the first electronic device 410 may capture a still image and/or video using the first UAV 481.

Figure 19:
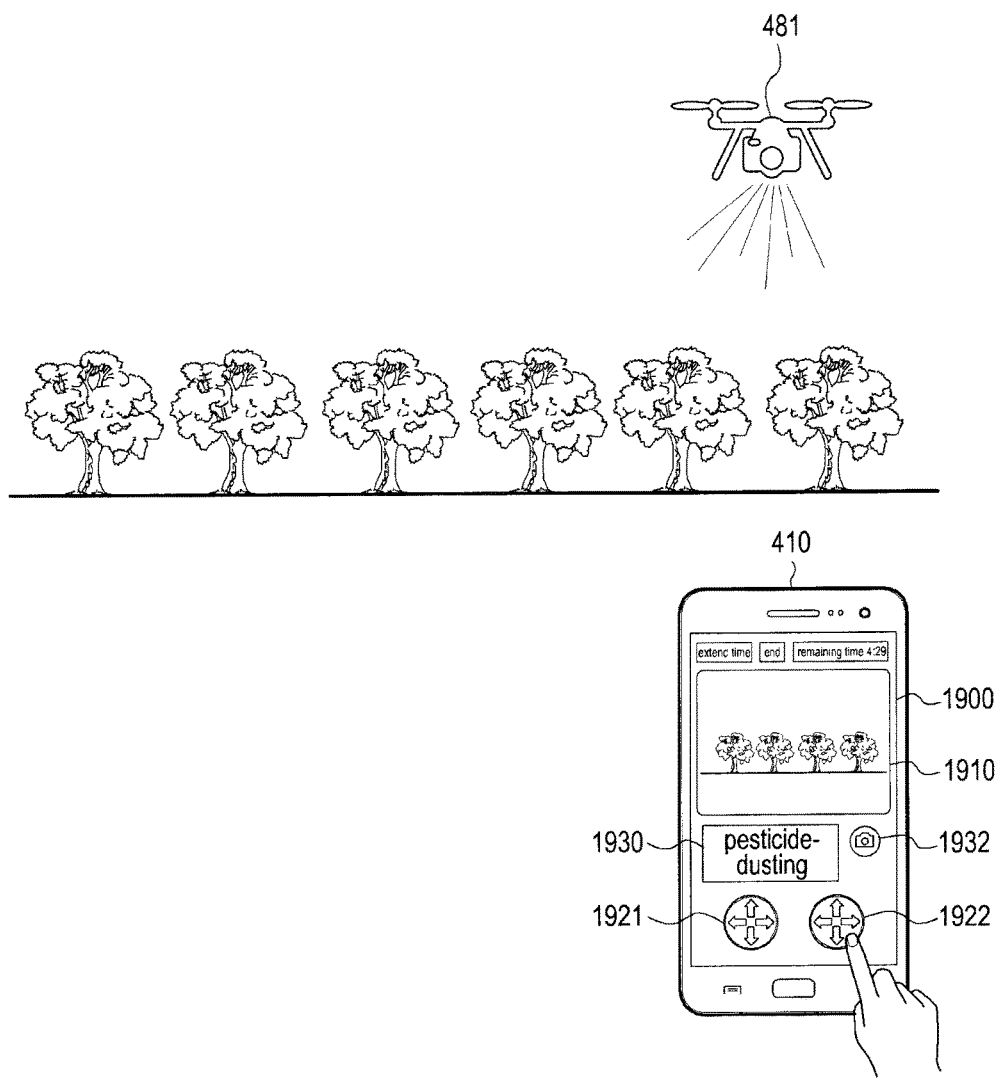
FIG. 19 is a block diagram illustrating operations of an electronic system according to an embodiment of the present disclosure.

FIG. 19 is a block diagram illustrating operations of an electronic system according to an embodiment of the present disclosure.

Referring to FIG. 19, a first electronic device 410 (e.g., the first electronic device 410 of FIG. 4A or the first electronic device 410 of FIG. 5A) may control a first UAV 481 (e.g., the first UAV 481 of FIG. 5C) through a second electronic device 450 (e.g., the second electronic device 450 of FIG. 4B or the second electronic device 450 of FIG. 5B), performing crop dusting.

According to an embodiment of the present disclosure, the first electronic device 410 may display a UI 1900 for controlling the first UAV 481. The first electronic device 410 may display the image captured by the first UAV 481 on a first screen 1910 included in the UI 1900.

The first electronic device 410 may move the first UAV 481 based on inputs to a first controller 1921 and a second controller 1922 included in the UI 1900.

The first electronic device 410 may conduct crop dusting using the first UAV 481 based on an input to a pesticide-dusting button 1930 included in the UI 1900. For example, upon receiving an input to the pesticide-dusting button 1930, the first UAV 481 may spray agricultural chemicals under the control of the first electronic device 410 and/or second electronic device 450.

The first electronic device 410 may capture an image using a camera module 495 included in the first UAV 481 based on an input to a capture image button 1932 included in the UI 1900.

Figure 20:
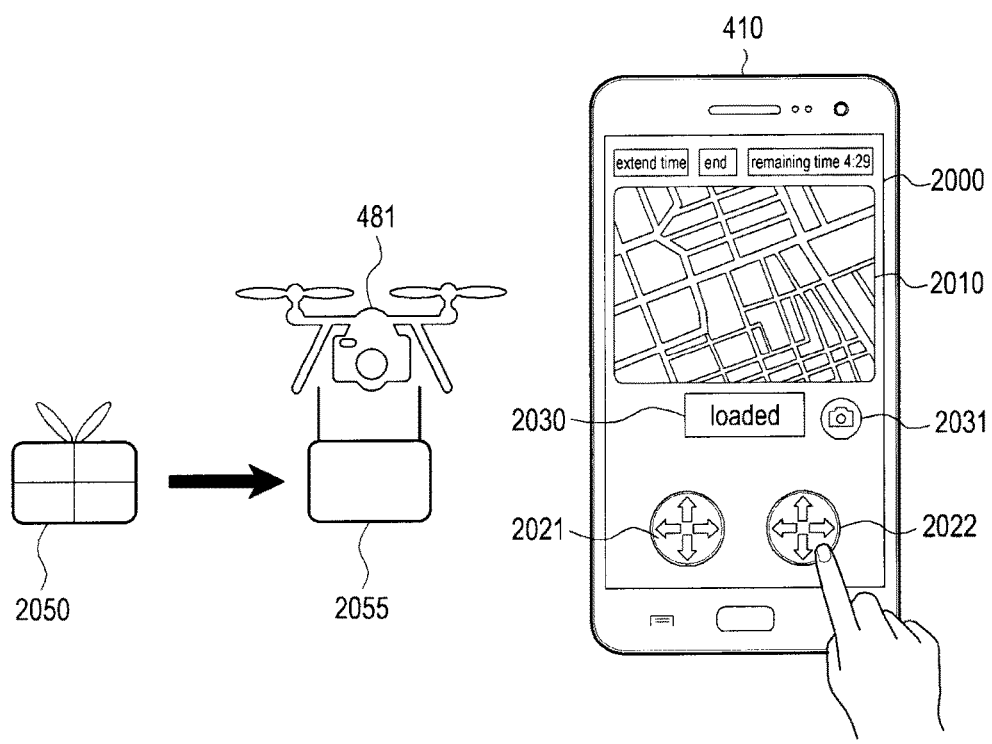
FIG. 20 is a block diagram illustrating operations of an electronic system according to an embodiment of the present disclosure.

FIG. 20 is a block diagram illustrating operations of an electronic system according to an embodiment of the present disclosure.

Referring to FIG. 20, a first electronic device 410 (e.g., the first electronic device 410 of FIG. 4A or the first electronic device 410 of FIG. 5A) may control a first UAV 481 (e.g., the first UAV 481 of FIG. 5C) through a second electronic device 450 (e.g., the second electronic device 450 of FIG. 4B or the second electronic device 450 of FIG. 5B), performing product delivery.

According to an embodiment of the present disclosure, the first electronic device 410 may display a UI 2000 for controlling the first UAV 481. The first electronic device 410 may display the image captured by the first UAV 481 on a first screen 2010 included in the UI 2000.

The first electronic device 410 may move the first UAV 481 based on inputs to a first controller 2021 and a second controller 2022 included in the UI 2000.

The first electronic device 410 may conduct product delivery using the first UAV 481 based on an input to a 'loaded' button 2030 included in the UI 2000. For example, upon receiving an input to the 'loaded' button 2030, the first UAV 481 may deliver the product to a designated destination under the control of the first electronic device 410 and/or second electronic device 450, as seen in elements 2050 and 2055.

The first electronic device 410 may capture an image using a camera module 495 included in the first UAV 481 based on an input to a capture image button 2031 included in the UI 2000.

According to an embodiment of the present disclosure, a system may include a computing device. The computing device may include a network interface configured to connect with at least one external electronic device having wireless communication functionality and a plurality of unmanned aerial vehicles (UAVs) through a wireless network, a processor electrically connected with the network interface, and a memory electrically connected with the processor. The memory may store instructions executed to enable the processor to receive location information about the external electronic device through the network interface, generate or obtain pictures and/or videos related to the location information, provide the pictures and/or videos to the external electronic device through the network interface, provide the external electronic device with control information related to a UAV selected from the plurality of UAVs through the network interface based on at least one first image selected from among the pictures and/or the videos by the external electronic device.

The instructions may enable the process to receive a first control signal related to control of the UAV selected from among the plurality of UAVs through the network interface from the external electronic device and provide a second control signal to the UAV selected from among the plurality of UAVs through the network interface in response to the first control signal.

The instructions may enable the processor to compare the first control signal with a control authority of the external electronic device on the selected UAV and to transmit the second control signal according to a result of the comparison.

The control information may include geographical information related to the location information about the external electronic device.

The geographical information may include information about a flyable area for the selected UAV.

The instructions may enable the processor to obtain state information related to the plurality of UAVs and select the UAV based on a first image and the state information.

The control information may include information related to a controllable time for the selected UAV.

The instructions may enable the processor to transmit a notification signal to indicate that a function using the selected UAV is terminated to the external electronic device when the controllable time for the selected UAV expires.

The instructions may enable the processor to transmit, to the external electronic device, the control information including information about a user interface (UI) for controlling the selected UAV.

According to an embodiment of the present disclosure, an electronic device may include a display, a communication circuit connected with a wireless network, a processor electrically connected with the communication circuit, and a memory electrically connected with the processor. The memory may store instructions executed to enable the processor to establish a wireless link with an external computing device through the communication circuit, transmit location information about the electronic device to the external computing device through the communication circuit, receive image data including a plurality of images related to the location information from the external computing device through the communication circuit, transmit information about a first image selected from among the plurality of images through the communication circuit to the external computing device, and receive, through the communication circuit from the external computing device, control information for controlling a first UAV related to the first image selected by the external computing device.

The instructions may enable the processor to receive an input signal related to control of the first UAV and transmit a first control signal for controlling the first UAV corresponding to the input signal through the communication circuit to the external computing device.

The control information may include geographical information related to the location information about the electronic device.

The geographical information may include information about a flyable area for the first UAV related to the selected image.

The control information may include information related to a controllable time for the first UAV.

The instructions may enable the processor to receive, from the external computing device, a notification signal to indicate that a function using the first UAV is terminated when the controllable time for the first UAV expires.

The control information may include information about a UI for controlling the first UAV.

The instructions may enable the processor to display the UI on the display and transmit a first control signal for controlling the first UAV to the external computing device in response to an input to the displayed UI.

The instructions may enable the processor to receive information about an image captured by the first UAV based on the control information through the external computing device.

The instructions may enable the processor to receive information about a state of the first UAV based on the control information through the external computing device.

According to an embodiment of the present disclosure, a method for operating a computing device may include establishing a wireless link with an external electronic device through a network interface, receiving location information about the external electronic device through the network interface to obtain image data including a plurality of images related to the location information, providing the image data to the external electronic device through the network interface, receiving information about a first image selected from among the plurality of images from the external electronic device through the network interface, selecting a first UAV from among a plurality of UAVs, and providing control information related to the selected first UAV to the external electronic device through the network interface based on the selected first image.

According to an embodiment of the present disclosure, the method may further include receiving a first control signal related to control of the first UAV selected from among the plurality of UAVs through the network interface from the external electronic device and providing a second control signal to the first UAV selected from among the plurality of UAVs through the network interface in response to the first control signal.

The control information may include information about a flyable area related to the location information about the external electronic device to perform a function using the first UAV.

According to an embodiment of the present disclosure, a method for operating an electronic device may include establish a wireless link with a computing device through a communication module, transmitting location information about the electronic device to the computing device through the communication module, receiving image data including a plurality of images related to the location information from the computing device through the communication module, transmitting information about a first image selected from among the plurality of images through the communication module to the computing device, and receiving control information for controlling a first UAV related to the first image selected by the computing device through the communication module from the computing device.

The method may further include receiving an input signal related to control of the first UAV and transmitting a first control signal for controlling the first UAV corresponding to the input signal through the communication module to the computing device.

The control information may include information about a flyable area related to the location information about the external electronic device to perform a function using the first UAV.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

As is apparent from the foregoing description, according to various embodiments of the present disclosure, an electronic device may set up an authority to temporarily control an UAV for another electronic device to perform a particular function, allowing the other electronic device to use the UAV.

The embodiments disclosed herein are proposed for description and understanding of the disclosed technology and does not limit the present disclosure. Accordingly, the present disclosure should be interpreted as including all changes or various embodiments based on the present disclosure.

What is claimed is:

1. A system, comprising a computing device, the computing device comprising:
    a network interface configured to communicatively connect with at least one external electronic device and a plurality of unmanned aerial vehicles (UAVs) through a wireless network;
    a processor electrically connected with the network interface; and
    a memory electrically connected with the processor, wherein the memory stores instructions executable by the processor to:
        obtain information related to a location of the external electronic device through the network interface,
        identify a plurality of media related to the location, wherein the plurality of media correspond to a plurality of functions, respectively,
        transmit information related to the plurality of media to the external electronic device through the network interface,
        in response to obtaining information related to a selection of at least one media of the plurality of media from the external electronic device, identify a particular UAV to perform at least one function corresponding to the selection of the at least one media among the plurality of UAVs, based at least on the information related to the selection and a state of each of the plurality of UAVs, and
        transmit, through the network interface, control information to the external electronic device, wherein the control information is for the external electronic device to control the particular UAV to perform the at least one function.

2. The system of claim 1, wherein the instructions are further executable by the processor to:
    in response to receiving a first control signal for controlling the particular UAV through the network interface from the external electronic device, transmit a second control signal to the particular UAV through the network interface.

3. The system of claim 2, wherein the instructions are further executable by the processor to compare the first control signal with a designated control authority of the external electronic device with reference to the particular UAV, and transmit the second control signal according to a result of the comparison.

4. The system of claim 1, wherein the control information includes geographical information corresponding to the location of the external electronic device.

5. The system of claim 4, wherein the geographical information includes information indicating a flyable area for the particular UAV.

6. The system of claim 1, wherein the instructions are further executable by the processor to identify state information related to the plurality of UAVs, and
    wherein identification of the particular UAV is further based on the state information in addition to the selected one of the plurality of media.

7. The system of claim 1, wherein the control information includes information indicating a remaining time for which the external electronic device retains control of the particular UAV.

8. The system of claim 7, wherein the instructions are further executable by the processor to transmit a notification signal indicating that control of the particular UAV is terminated in response to detecting expiry of the remaining time.

9. The system of claim 1, wherein the control information transmitted to the external electronic device further includes a user interface (UI) including icons selectable to control the particular UAV.

10. An electronic device, comprising:
    a display;
    a communication circuit communicatively connected with a wireless network;
    a processor electrically coupled with the communication circuit; and
    a memory electrically coupled with the processor, wherein the memory stores instructions executable by the processor to:
        establish a wireless link with an external computing device through the communication circuit,
        transmit information related to a location of the electronic device to the external computing device through the communication circuit,
        receive data including a plurality of media related to the location from the external computing device through the communication circuit, wherein the plurality of media correspond to a plurality of functions, respectively,
        detect a selection of a first media from among the plurality of media and transmit information related to the selection to the external computing device, and
        receive, from the external computing device control information, wherein the control information is for the electronic device to control a first unmanned aerial vehicle (UAV) to perform a function corresponding to the first media, wherein the first UAV is selected from a plurality of UAVs based at least on the information related to the selection and a state of each of the plurality of UAVs.

11. The electronic device of claim 10, wherein the instructions are further executable by the processor to detect an input signal for controlling the first UAV, and transmit a first control signal corresponding to the detected input signal through the communication circuit to the external computing device to control the first UAV.

12. The electronic device of claim 10, wherein the control information includes geographical information related to the location of the electronic device.

13. The electronic device of claim 12, wherein the geographical information includes an indication of a flyable area for the first UAV.

14. The electronic device of claim 10, wherein the control information indicates a remaining time for which the electronic device retains control over the first UAV.

15. The electronic device of claim 14, wherein the instructions are further executable by the processor to:
receive, from the external computing device, a notification signal indicating that control of the first UAV is terminated when the remaining time expires.

16. The electronic device of claim 10, wherein the control information includes a user interface (UI) including icons selectable to control the first UAV.

17. The electronic device of claim 16, wherein the instructions are further executable by the processor to control the display to display the UI and transmit a first control signal for controlling the first UAV to the external computing device in response to detecting an input to the displayed UI.

18. A method in a computing device, comprising:
establishing a wireless link with an external electronic device through a network interface;
in response to obtaining information related to a location of the external electronic device through the network interface, identifying a plurality of media related to the location, wherein the plurality of media correspond to a plurality of functions, respectively;
transmitting information related to the plurality of media to the external electronic device through the network interface;
receiving, from the external electronic device, information related to a selection of a first media from among the plurality of media through the network interface;
identifying a first unmanned aerial vehicle (UAV) to perform a function corresponding to the first media from among a plurality of UAVs, based at least on the information related to the selection and a state of each of the plurality of UAVs; and
transmitting, through the network interface, control information to the external electronic device, wherein the control information is for the external electronic device to control the first UAV to perform the function.

19. The method of claim 18, further comprising:
in response to receiving, through the network interface, a first control signal for control of the first UAV from the external electronic device, transmitting a second control signal to the first UAV.

20. The method of claim 18, wherein the control information includes information indicating a flyable area corresponding to the location in which a function is executable by the first UAV.

* * * * *